(12) United States Patent
Kakimoto et al.

(10) Patent No.: US 7,364,628 B2
(45) Date of Patent: Apr. 29, 2008

(54) SOLID MATERIAL FOR MAGNET

(75) Inventors: Etsuji Kakimoto, Kiyama (JP); Kiyotaka Dohke, Oita (JP); Ichiro Shibasaki, Fuji (JP); Nobuyoshi Imaoka, Fuji (JP); Akira Chiba, Kumamoto (JP)

(73) Assignee: Asahi Kasei Kabushiki Kaisha, Osaka (JP)

( * ) Notice: Subject to any disclaimer, the term of this patent is extended or adjusted under 35 U.S.C. 154(b) by 168 days.

(21) Appl. No.: 10/475,617

(22) PCT Filed: Apr. 24, 2002

(86) PCT No.: PCT/JP02/04089

§ 371 (c)(1),
(2), (4) Date: Oct. 22, 2003

(87) PCT Pub. No.: WO02/089153

PCT Pub. Date: Nov. 7, 2002

(65) Prior Publication Data

US 2004/0149357 A1  Aug. 5, 2004

(30) Foreign Application Priority Data

Apr. 24, 2001 (JP) ............................. 2001-125344
Apr. 27, 2001 (JP) ............................. 2001-131580
Jun. 29, 2001 (JP) ............................. 2001-197889

(51) Int. Cl.
*H01F 1/059* (2006.01)
(52) U.S. Cl. .................. 148/101; 148/103; 419/13; 419/68
(58) Field of Classification Search ................... None
See application file for complete search history.

(56) References Cited

U.S. PATENT DOCUMENTS

| 5,164,104 A | * | 11/1992 | Kobayashi et al. ...... 252/62.57 |
| 5,186,766 A | | 2/1993 | Iriyama et al. |
| 5,425,818 A | | 6/1995 | Hirosawa et al. |
| 6,413,327 B1 | * | 7/2002 | Okajima et al. ............ 148/301 |
| 6,482,353 B1 | | 11/2002 | Kuniyoshi et al. |
| 2001/0054453 A1 | * | 12/2001 | Sakurada et al. ........... 148/122 |

FOREIGN PATENT DOCUMENTS

| EP | 0 369 097 A1 | 5/1990 |
| EP | 0 417 733 A2 | 3/1991 |
| EP | 1 085 531 A2 | 3/2001 |
| JP | 63-301505 * | 12/1988 ................ 148/302 |
| JP | 04-079202 | 3/1992 |

(Continued)

OTHER PUBLICATIONS

"Properties, Stability and Applications of High-Performance Permanent Magnets,"—Collection of Data and Materials of Rare Earth Magnets—, Institute of Electrical Engineers of Japan Technical Report No. 729, p. 41 (1999) with English translation.

(Continued)

*Primary Examiner*—John P. Sheehan
(74) *Attorney, Agent, or Firm*—Finnegan, Henderson, Farabow, Garrett & Dunner, L.L.P.

(57) ABSTRACT

A solid material for a magnet, comprising a rare-earth/iron/nitrogen/hydrogen system magnetic material.

4 Claims, 9 Drawing Sheets

FOREIGN PATENT DOCUMENTS

| | | |
|---|---|---|
| JP | 05-222483 | 8/1993 |
| JP | 06-124812 | 5/1994 |
| JP | 08-191006 | 7/1996 |
| JP | 09-057089 | 3/1997 |
| JP | 2703281 | 10/1997 |
| JP | 2705985 | 10/1997 |
| JP | 3108232 | 9/2000 |
| JP | 2001-006959 | 1/2001 |
| JP | 2001-093713 | 4/2001 |
| KR | A-2001-22276 | 3/2001 |
| KR | A-2001-70210 | 7/2001 |
| WO | WO 93/20567 * | 10/1993 |
| WO | WO-9962081 A1 | 12/1999 |

OTHER PUBLICATIONS

K. Noguchi et al., "High-performance resin-bonded magnets produced from zinc metal-coated $Sm_2(Fe_{0.9}Co_{0.1})_{17}N_x$ fine powders," Applied Physics Letters, vol. 75, 11 (Sep. 13, 1999).

Tsutomu Mashimo et al., "Fully dense $Sm_2Fe_{17}N_x$ permanent magnets prepared by shock compression," J. Appl. Phys. 80 (1), (Jul. 1, 1996).

T. Iriyama et al., Effect of Nitrogen Content on Magnetic Properties of $Sm_2Fe_{17}N_x$ ($0<x<6$), *IEEE Transactions on Magnetics* 28(5):2326-2331 (1992).

Y. Baba, "Rare Earth Permanent Magnets," *Metal Resource Report* 35(3):103-109 (2005).

S. Suzuki et al., "Development and Their Applications of Rare Earth Magnets with Small and High Peformance," *Material Integration* 16(7), p. 17 (2003).

T. Iriyama et al., "The Discovery of $Sm_2Fe_{17}N_x$ Permanent Magnet Material," *Particle and Powder Metallurgy* 43(1):59-65 (1996).

K. Saito et al., "Microstructural Changes with N Content in Sm—Fe—N Alloys," *Japan Applied Magnetism Memoir* 18(2):201-204 (1994).

Majima et al., "Preparation of Anisotropic Sm—Fe—N Magnetic Powders Nitrided in (HN3+H2) Mixed Gas and Their Magnetic Properties," *Particle and Powder Metallurgy* 43(5):624-628 (1996).

"Nitride Ceramics," Nikkan Kogyo Shimbun Co. (1998).

Suzuki et al., "Magnetic Properties of $Sm_2Fe_{17}N_x$ Powder and Bonded Magnet," *IEEE Transactions on Magnetics* 28(2):994-997 (1992).

Otani et al., Metal Bonded $Sm_2Fe_{17}N_x$—δ Magnets, J Appl. Phys., 69(9), p. 6735 (1991).

* cited by examiner

SOLID MATERIAL FOR MAGNET

TECHNICAL FIELD

The present invention relates to a rare-earth/iron/nitrogen/hydrogen system solid material for a magnet, which has a high density and superior magnetic properties and is excellent in thermal stability and oxidation resistance. The present invention also relates to a rare-earth/iron/nitrogen/hydrogen system solid material for a magnet, which in spite of lightness in weight, has superior magnetic properties and has excellent thermal stability.

The present invention relates to a device and a part, wherein a magnet comprising said solid material is utilized.

The present invention also relates to a method of producing a solid material for a magnet, comprising the step of subjecting magnetic material powders to shock-compression with decomposition and denitrification prevented, so as to provide a high-performance permanent magnet with a high density.

The term "a solid material" herein referred to indicates a bulk material. Furthermore, the term "a solid material for a magnet" herein referred to indicates a bulk magnetic material wherein magnetic-material powders constituting the solid material are bonded to one another, directly, or through a metallic phase or inorganic phase so as to form a bulk as a whole. A magnet also belongs to the category of "a solid material for a magnet" herein referred to; a material in a state in which it is magnetized by magnetization and has a residual magnetic flux density is referred to as "a magnet".

The term "rare-earth elements" herein refers to indicates Y of Group IIIa in the periodic table; and the fifteen elements of the La-series with atomic numbers 57 to 71 therein, that is, La, Ce, Pr, Nd, Pm, Sm, Eu, Gd, Tb, Dy, Ho, Er, Tm, Yb and Lu.

The term "decomposition" herein referred to indicates a phenomenon that as a rare-earth/iron/nitrogen/hydrogen system magnetic material powder is changed in crystal structure, a decomposed phase of $\alpha$-Fe is formed. The above decomposition is a phenomenon to be prevented, since the presence of this $\alpha$-Fe decomposed phase adversely affects magnetic properties.

BACKGRAND ART

As a high-performance rare-earth magnet, for example, a Sm—Co system magnet, and an Nd—Fe—B system magnet are known. The former has been broadly used due to its high thermal-stability, corrosion resistance and the like, while the latter has been broadly used due to its very superior magnetic properties, low cost, stability in raw-materials provisioning, and the like. Today, a rare-earth magnet which has both a higher thermal-stability and superior magnetic properties and is inexpensive in raw-materials cost has been demanded for an actuator for electric equipment or various FAs, or a magnet for a rotating machine.

On the other hand, it is reported that when a rare-earth/iron compound having a rhombohedral or hexagonal crystal structure is reacted in a mixed gas of $NH_3$ and $H_2$, and the like at a relatively low temperature in the range of 400° C. to 600° C., nitrogen and hydrogen atoms enter into interstitial sites of the above-mentioned crystal, for example, a $Th_2Zn_{17}$-type compound, which gives rise to a remarkable increase in Curie temperature and/or magnetic anisotropy (See Japanese Patent No. 2703281, and U.S. Pat. No. 5,186,766).

Now recently, such a rare-earth/iron/nitrogen system magnetic material has been expected to come to practical use as a new magnet material capable of satisfying the above-mentioned demand.

A rare-earth/iron/nitrogen/hydrogen system magnetic material (which is hereinafter referred to as "an R—Fe—N—H system magnetic material") including nitrogen and hydrogen atoms within the lattice of an intermetallic compound and having the above-mentioned rhombohedral or hexagonal crystal structure is generally derived in the form of powders. However, since it is easily decomposed into an $\alpha$-Fe decomposed phase and a rare-earth nitride phase at a temperature of about 600° C. or more at normal pressures, it is very difficult to solidify the same by means of self-sintering so as to prepare a solid material for a magnet according to ordinary industrial processes.

Accordingly, as a magnet using an R—Fe—N—H system magnet material, a bonded magnet with a resin binder is produced and used. Although many of magnets as produced with said material have a Curie temperature of 400° C. or more and include magnetic powders which will intrinsically lose no magnetization even at a temperature of 200° C. or more, the irreversible demagnetization factor is increased. This is mainly because the heat-resistance temperature of a binder such as a 12-nylon resin is low, and the temperature coefficient of a coercive force is about −0.5%/° C. while the coercive force is low such as 0.6 MA/m (See Institute of Electrical Engineers of Japan Technical Report No. 729, Institute of Electrical Engineers of Japan Edit, p. 41). Therefore, the above magnets have been generally used merely at a temperature of less than 100° C. That is, when a brushless motor or the like as a power source which is used in a high-temperature environment of 150° C. or more by request for a recent high loading is manufactured, there has existed the problem that this type of bonded magnet can not be employed.

Besides, when a compression-molded bonded-magnet including a resin as a binder is manufactured, there has existed the problems that a compacting pressure of 1 GPa or more is necessary in order to enhance the packing fraction to offer technical advantages, but it is difficult to industrially apply such a compacting pressure; considering the useful life of a mold, the mixture ratio of a magnetic material is forced to be set to less than 80% in volume fraction in most cases; and thus the compression-molded bonded-magnet can not satisfactorily bring out excellent basic magnetic properties of the R—Fe—N—H system magnetic material.

Among bonded magnets wherein an R—Fe—N—H system magnetic material is used as a raw material, as the one having remarkably superior magnetic properties, for example, a compression-molded bonded-magnet having $(BH)_{max}$ of 186 kJ/m³ is reported (See Appl. Phys. Lett., Vol.75, 11, p.1601). However, this bonded magnet does not satisfactorily bring out high basic magnetic properties of the R—Fe—N—H system magnetic material as compared with those of a conventional Sm—Co system or Nd—Fe—B system sintered magnet or the like.

In order to solve the problems mentioned above, Japanese Patent-containing Gazette No. 3108232 (U.S. Pat. No. 5,425,818) suggests a method of producing a rare-earth/iron/nitrogen system permanent magnet with no resin binder. However, this method had the disadvantage that the pressure for shock compression had to be limited within a certain range in order to inhibit a residual temperature after the shock compression to the decomposition temperature of $Th_2Zn_{17}$ type rare-earth/iron/nitrogen system magnetic material, or to a temperature less than the decomposition temperature. This is because when conventional shock waves are used, in spite of a short duration of the shockwaves as such, the temperature of the magnetic material is high and is maintained over a long period of time, and consequently, the magnetic material may be decomposed.

Furthermore, according to such a method, the density of the resultant material was limited to 7.28 g/cm$^3$ even at the maximum. Additionally, since the decomposition of the rare-earth/iron/nitrogen system magnetic material could not be satisfactorily suppressed, the coercive force was also limited to a low value of 0.21 MA/m even at the maximum.

Besides, JP-A-2001-6959 discloses a method of compacting and solidifying a Th$_2$Zn$_{17}$ type rare-earth/iron/nitrogen system magnetic material using cylindrical convergent shock-waves. However, even in the magnet provided according to this method, the maximum value of the density is 7.43 g/cm3 and the maximum value of the coercive force was 0.62 MA/m, which were not satisfactory.

Additionally, one embodiment of a Th$_2$Zn$_{17}$ type rare-earth/iron/nitrogen system magnetic material as formed by means of shock wave compression is reported in J. Appl. Phys., Vol. 80, No. 1, p.356. However, the packing fraction is lowered when the pressure of shock-waves is 10 GPa, and there is decomposition into an α-Fe decomposition phase and a SmN phase is progressed when it is 20 GPa, as the compact density under individual shock-compression conditions does not necessarily go beyond 7.45 g/cm$^3$. and in the maximum value of magnetic properties is 0.57 MA/m in coercive force and $(BH)_{max}$=134 kJ/m$^3$, and thus it could not be said that satisfactorily superior magnetic properties are provided for the Th$_2$Zn$_{17}$ type R—Fe—N—H system bonded magnets.

As mentioned above, a high-density solid material for a magnet with no decomposition, with superior magnetic properties, and with thermal-stability improved has been strongly desired.

In addition to the application of these high-performance magnetic materials to a high-performance magnet, in applications to consumer electronics, office automation appliances, and electric vehicles, the direction to weight-saving and high-performance has been also demanded. Since the density of a Sm—Co system magnet is about 8.4 g/cm$^3$ and the density of an Nd—Fe—B system magnet is about 7.5 g/cm$^3$, a device, a rotor or the like tends to increase in weight when it is loaded with any one of these magnets, whereby the energy efficiency may be sometimes decreased. Furthermore, since some applications have enough room for magnetic properties, even if weight saving is achievable by downsizing the magnet, considering a process yield, it could not be necessarily said to be advantageous in cost. For example, since the amount of a cutting waste of the magnet is proportional to a cutting area thereof, the smaller the volume of the magnet comes to be, the smaller the yield per unit volume of a product comes to be.

Various bonded magnets are poor in thermal stability as described above. Thus a high cost performance magnet which has high magnetic properties and is excellent in thermal-stability in spite of its light-weight has been not developed yet.

DISCLOSURE OF THE INVENTION

A first object of the present invention is to provide an R—Fe—N—H system solid material for a magnet, which has a high density and superior magnetic properties and is excellent in thermal-stability and oxidation resistance, and to provide a method of producing the same. It is to provide the R—Fe—N—H system solid material for a magnet, which has in particular a density of higher than 7.45 g/cm$^3$, and to provide a method of producing the same. According to the present invention, the solid material for a magnet, which also includes a magnet as magnetized by magnetization or the like, is provided.

A second object of the present invention is to provide a solid material for a magnet, characterized in that said solid material includes an R—Fe—N—H system magnetic material having a rhombohedral or hexagonal crystal structure in an amount of 80 to 97% by volume; has a low density of 6.15 to 7.45 g/cm$^3$; and is excellent in magnetic properties and stability in spite of its light-weight, and to provide a method of producing the same. According to the present invention, the solid material for a magnet, which also includes a magnet as magnetized by magnetization or the like, is provided.

A third object of the present invention is to provide a part or a device, wherein the above-mentioned solid material for a magnet is utilized.

The present inventors have been devoted to considering about the problems mentioned above. Consequently, it has been found that a high-density solid material for a magnet, mainly including an R—Fe—N—H system magnetic material, can be derived by the steps of: incorporating hydrogen in powders of a rare-earth/iron/nitrogen system magnetic material having a rhombohedral or hexagonal crystal structure so as to form a powder compact from the same in a magnetic field or no magnetic field; and thereafter subjecting the same to shock-compaction using underwater shockwaves; and controlling a residual temperature after the shock-compression to the decomposition temperature (about 600° C. at normal pressures) of the R—Fe—N—H system magnetic material, or to a temperature less than the decomposition temperature so as to prevent the decomposition while characteristics of shock-compression, such as superhigh-pressure shearing properties, an activating action, a short-time phenomenon and the like are put to good use, whereby the present invention has been accomplished.

Besides, in order to derive a high-density R—Fe—N—H system solid material for a magnet having a rhombohedral or hexagonal crystal structure with good reproducibility, the present inventors have been devoted to investigating a composition of powders and a method of producing the solid material. Consequently, they have had information that a solid material for a magnet, which comprises an R—Fe—N—H system magnetic material, has a density of larger than 7.45 g/cm$^3$ and $(BH)_{max}$ of 200 kJ/m$^3$ or more, and is solidified by metallic bonds can be easily derived by the steps of: forming powders of a magnetic material including hydrogen and nitrogen in a magnetic field into a powder compact; and thereafter subjecting said powder compact to shock-compression by means of underwater shock-waves having a specific shock-waves pressure while preventing decomposition and denitrification, whereby the present invention has been accomplished.

Furthermore, the present inventors have also found that when the above underwater shock waves were used, an R—Fe—N—H system magnetic material and a hard-magnetic and/or soft-magnetic powders or solid material, or a non-magnetic powders or solid material can be easily integrated, whereby the present invention has been accomplished.

Besides, in order to further derive a solid material for a magnet, which comprises an R—Fe—N—H system magnetic material having a rhombohedral or hexagonal crystal structure, and is light in weight and high in magnetic properties and stability, the present inventors have been devoted to investigating a composition of raw materials, the percentage content thereof, and a method of producing the same. Consequently, they have derived information that an R—Fe—N—H system solid material for a magnet, which has a density in the range of 6.15 to 7.45 g/cm$^3$, and is usable even at a temperature of 100° C. or more, and solidified by metallic bonds can be easily derived by the steps of: providing powders of a magnetic material including hydrogen as well as nitrogen, adjusting the volume fraction to a range of 80 to 97% by volume, forming a powder compact therefrom in a magnetic field, and thereafter subjecting said powder compact to shock-compression by means of underwater shock-waves having a specific shock-waves pressure, whereby the present invention has been accomplished.

That is, modes of the present invention are as follows:
(1) A solid material for a magnet, comprising a rare-earth/iron/nitrogen/hydrogen system magnetic material; and
(2) A solid material for a magnet, comprising a rare-earth/iron/nitrogen/hydrogen system magnetic powders and having a density higher than 7.45 g/cm$^3$; and
(3) A solid material for a magnet, comprising a rare-earth/iron/nitrogen/hydrogen system magnetic material in an amount of 80 to 97% by volume and being light in weight; and
(4) A solid material for a magnet, comprising a rare-earth/iron/nitrogen/hydrogen system magnetic material and having a density of 6.15 to 7.45 g/cm$^3$ and being light in weight; and
(5) A solid material for a magnet, comprising a rare-earth/iron/nitrogen/hydrogen system magnetic material and having a rhombohedral or hexagonal crystal structure; and
(6) A solid material for a magnet, comprising a rare-earth/iron/nitrogen/hydrogen system magnetic material represented by the general formula:

$$R_\alpha Fe_{100-\alpha-\beta-\gamma}N_\beta H_\gamma$$

wherein R is at least one element selected from rare-earth elements; and α, β and γ are atomic percentages and $3 \leq \alpha \leq 20$, $5 \leq \beta \leq 30$ and $0.01 \leq \gamma \leq 10$, respectively; and
(7) A solid material for a magnet, comprising a rare-earth/iron/nitrogen/hydrogen system magnetic material, wherein said rare-earth/iron/nitrogen/hydrogen system magnetic material is represented by the general formula:

$$R_\alpha Fe_{100-\alpha-\beta-\gamma-\delta}N_\beta H_\gamma M_\delta$$

wherein R is at least one element selected from rare-earth elements; M is at least one element selected from the group consisting of Li, Na, K, Mg, Ca, Sr, Ba, Ti, Zr, Hf, V, Nb, Ta, Cr, Mo, W, Mn, Pd, Cu, Ag, Zn, B, Al, Ga, In, C, Si, Ge, Sn, Pb and Bi, and/or at least one selected from the group consisting of oxides, fluorides, carbides, nitrides, hydrides, carbonates, sulfates, silicates, chlorides and nitrates of R; and α, β, γ and δ are atomic percentages and $3 \leq \alpha \leq 20$, $5 \leq \beta \leq 30$, $0.01 \leq \gamma \leq 10$ and $0.1 \leq \delta \leq 40$, respectively; and
(8) A solid material for a magnet, as described in any one of the items (1) to (7), wherein 50 atomic percentage or more of the amount of said rare-earth is Sm; and
(9) A solid material for a magnet, as described in any one of the items (1) to (7), wherein 0.01 to 50 atomic percentage of the amount of said iron is substituted with Co; and
(A) A rare-earth/iron/nitrogen/hydrogen system solid material for a magnet, as described in the item (6), wherein said magnetic material represented by the general formula:

$$R_\alpha Fe_{100-\alpha-\beta-\gamma}N_\beta H_\gamma$$

has a rhombohedral or hexagonal crystal structure; and
(B) A solid material for a magnet, as described in the item (6) or (A), wherein 10 atomic percentage or less of the amount of said R and/or Fe are replaced with at least one element selected from the group consisting of Ni, Ti, V, Cr, Mn, Zn, Cu, Zr, Nb, Mo, Ta, W, Ru, Rh, Pd, Hf, Re, Os and Ir; and
(C) A solid material for a magnet, as described in the item (6), (A) or (B), wherein 10 atomic percentage or less of the amount of said N and/or H are replaced with at least one element selected from the group consisting of C, P, Si, S and Al; and.
(D) A solid material for a magnet, as described in the item (7), wherein said magnetic material represented by the general formula:

$$R_\alpha Fe_{100-\alpha-\beta-\gamma-\delta}N_\beta H_\gamma M_\delta$$

has a rhombohedral or hexagonal crystal structure; and
(E) A solid material for a magnet, as described in any one of the items (A) to (D), wherein 50 atomic percentage or more of the amount of said rare-earth is Sm; and
(F) A solid material for a magnet, as described in any one of the items (A) to (E), wherein 0.01 to 50 atomic percentage of the amount of said iron is substituted with Co; and
(G) A rare-earth/iron/nitrogen/hydrogen system solid material for a magnet, as described in any one of the items (5) to (7) and (A) to (F), having a density higher than 7.45 g/cm$^3$; and
(H) A solid material for a magnet, as described in the item (3) or (4), wherein said magnetic material has a rhombohedral or hexagonal crystal structure; and
(I) A solid material for a magnet, as described in any one of the items (3), (4) and (H), wherein said rare-earth/iron/nitrogen/hydrogen system magnetic material is represented by the general formula:

$$R_\alpha Fe_{100-\alpha-\beta-\gamma}N_\beta H_\gamma$$

wherein R is at least one element selected from rare-earth elements including Y; and α, β and γ are atomic percentages and $3 \leq \alpha \leq 20$, $5 \leq \beta \leq 30$ and $0.01 \leq \gamma \leq 10$, respectively; and
(J) A solid material for a magnet, as described in any one of the items (3), (4), (H) and (I), wherein 10 atomic percentage or less of the amount of said R and/or Fe are replaced with at least one element selected from the group consisting of Ni, Ti, V, Cr, Mn, Zn, Cu, Zr, Nb, Mo, Ta, W, Ru, Rh, Pd, Hf, Re, Os and Ir; and
(K) A solid material for a magnet, as described in any one of the items (3), (4) and (H) to (J), wherein 10 atomic percentage or less of the amount of said N and/or H are replaced with at least one element selected from the group consisting of C, P, Si, S and Al; and
(L) A solid material for a magnet, as described in any one of the items (3), (4) and (H), wherein said rare-earth/iron/nitrogen/hydrogen system magnetic material is represented by the general formula:

$$R_\alpha Fe_{100-\alpha-\beta-\gamma-\delta}N_\beta H_\gamma M_\delta$$

wherein R is at least one element selected from rare-earth elements including Y; M is at least one element selected from the group consisting of Li, Na, K, Mg, Ca, Sr, Ba, Ti, Zr, Hf, V, Nb, Ta, Cr, Mo, W, Mn, Pd, Cu, Ag, Zn, B, Al, Ga, In, C, Si, Ge, Sn, Pb and Bi, and/or at least one selected from the group consisting of oxides, fluorides, carbides, nitrides, hydrides, carbonates, sulfates, silicates, chlorides and nitrates of R; and α, β, γ and δ are atomic percentages $3 \leq \alpha \leq 20$, $5 \leq \beta \leq 30$, $0.01 \leq \gamma \leq 10$ and $0.1 \leq \delta \leq 40$, respectively; and (M) A solid material for a magnet, as described in any one of the items (H) to (L), wherein 50 atomic percentage or more of the amount of said rare-earth is Sm; and (N) A solid material for a magnet, as described in any one of the items (H) to (M), wherein 0.01 to 50 atomic percentage of the amount of said iron is substituted with Co; and

(10) A solid material for a magnet, as described in any one of the items (1) and (3) to (7), wherein the component(s) other than said rare-earth/iron/nitrogen/hydrogen system magnetic material is(are) an element(s) or compound(s) having a density of 6.5 g/cm³ or less, or a mixture thereof; and (O) A solid material for a magnet, as described in any one of the items (H) to (N), wherein the component(s) in addition to said rare-earth/iron/nitrogen/hydrogen system magnetic material is(are) an element(s) or compound(s) having a density of 6.5 g/cm³ or less, or a mixture thereof; and (P) A solid material for a magnet, as described in any one of the items (10), (H) to (O), wherein a moiety in addition to said rare-earth/iron/nitrogen/hydrogen system magnetic material comprises at least one selected from the group consisting of inert gases, and a reducing gases; and (Q) A solid material for a magnet, as described in any one of the items (10), (H) to (P), wherein a moiety in addition to said rare-earth/iron/nitrogen/hydrogen system magnetic material comprises at least one selected from the group consisting of oxides, fluorides, carbides, nitrides, hydrides, carbonates, sulfates, silicates, chlorides and nitrates; and (R) A solid material for a magnet, as described in any one of the items (10), (H) to (O), wherein a moiety in addition to said rare-earth/iron/nitrogen/hydrogen system magnetic material comprises an organic matter; and

(11) A solid material for a magnet, as described in any one of the items (1) to (7), wherein said solid material has a relational expression $$B_r \leq \mu_o H_{cJ}(P_c+1)(11000-50T_{max})/(10000-6T_{max})$$

wherein $B_r$ is a residual magnetic flux density at normal room temperature, $H_{cJ}$ is a coercive force at normal room temperature, $P_c$ is a permeance coefficient when said solid material is used as a magnet, and $T_{max}$ is a maximum working temperature and $\mu_o$ is an absolute permeability of vacuum; and (S) A solid material for a magnet, as described in any one of the items (8) to (10) and (A) to (R), wherein said solid material has a relational expression:

$$B_r \leq \mu_o H_{cJ}(P_c+1)(11000-50T_{max})/(10000-6T_{max})$$

wherein $B_r$ is a residual magnetic flux density at normal room temperature, $H_{cJ}$ is a coercive force at normal room temperature, $P_c$ is a permeance coefficient when said solid material is used as a magnet, and $T_{max}$ is a maximum working temperature and $\mu_o$ is an absolute permeability of vacuum; and (T) A solid material for a magnet, as described in any one of the items (1) to (11) and (A) to (S), wherein said coercive force ($H_{cJ}$) is 0.76 MA/m or more, and a rectangularity ratio ($B_r/J_s$) is 95% or more; and

(12) A solid material for a magnet, as described in any one of the terms (1) to (7), wherein a soft magnetic material including at least one element selected from the group consisting of Fe, Co and Ni is homogeneously dispersed therein and integrated therewith; and (U) A solid material for a magnet, as described in any one of the terms (8) to (11) and (A) to (T), wherein a soft magnetic material including at least one element selected from the group consisting of Fe, Co and Ni is homogeneously dispersed therein and integrated therewith; and

(13) A solid material for a magnet, as described in any one of the terms (1) to (7), wherein at least one magnetic material selected from the group consisting of a rare-earth/iron/boron system magnetic material, a rare-earth/cobalt system magnetic material, and a ferritic magnetic material is added thereto and homogeneously mixed and integrated; and (V) A solid material for a magnet, as described in any one of the terms (8) to (12) and (A) to (U), wherein at least one magnetic material selected from the group consisting of a rare-earth/iron/boron system magnetic material, a rare-earth/cobalt system magnetic material, and a ferritic magnetic material is added thereto and homogeneously mixed and integrated; and

(14) A solid material for a magnet, as described in any one of the terms (1) to (7), wherein a non-magnetic phase exists in a grain boundary of said magnetic material; and (W) A solid material for a magnet, as described in any one of the terms (8) to (13) and (A) to (V), wherein a non-magnetic phase exists in a grain boundary of said magnetic material; and

(15) A solid material for a magnet, wherein a solid material for a magnet as described in any one of the terms (1) to (7) and a solid metallic material with soft magnetism are jointed to be integrated with each other; and (X) A solid material for a magnet, wherein a solid material for a magnet as described in any one of the terms (8) to (14) and (A) to (W) and a solid metallic material with soft magnetism are jointed to be integrated with each other; and (Y) A solid material for a magnet, having a soft magnetic layer, wherein said soft magnetic layer and a solid material for a magnet as described in any one of the terms (1) to (15) and (A) to (X) are alternately laminated to be integrated with each other; and (Z) A solid material for a magnet, wherein at least moiety of said solid material for a magnet as described in any one of the terms (1) to (15) and (A) to (Y) is covered with a non-magnetic solid material; and (a) A solid material for a magnet, as described in any one of the terms (1) to (15) and (A) to (Z), to which a magnetic anisotropy is imparted; and (b) A solid material for a magnet, as described in any one of the terms (1) to (15), (A) to (Z) and (a), which is subjected to shock-compaction by using underwater shock-waves; and (c) A solid material for a magnet, as described in any one of the terms (1) to (15), (A) to (Z), (a) and (b), which is shaped into a rectangular, cylindrical, ring, discoid, or flat shape; and

(16) A method of producing a solid material for a magnet comprising a rare-earth/iron/nitrogen/hydrogen system magnetic material, wherein underwater shock-waves are employed when said solid material is subjected to shock-compaction; and

(17) A method as described in the item (16), wherein the pressure of shock-waves is in the range of 3 to 40 GPa; and (d) A method as described in any one of the items (1) to (15), (A) to (Z), and (a) to (c), wherein the pressure of shock-waves is in the range of 3 to 40 GPa; and (e) A method as described in the item (2) or (G), wherein the pressure of shock-waves is in the range of 8 to 40 GPa; and (f) A method as described in the item (3), (4), (10) and (H) to (R), wherein the pressure of shock-waves is in the range of 3 to 22 GPa; and

(18) A method as described in the item (16), wherein raw-material powders are subjected to powder compacting in a magnetic field; and (g) A method of producing a rare-earth/iron/nitrogen/hydrogen system solid material for a magnet, comprising the steps of: subjecting raw-material powders to powder compacting, and thereafter subjecting the same to shock-compaction by using underwater shock-waves; and (h) A method of producing a rare-earth/iron/nitrogen/hydrogen system solid material for a magnet, comprising the steps of: subjecting raw-material powders to powder compacting in a magnetic field, and thereafter subjecting the same to shock-compaction by using underwater shock-waves; and (i) A method of producing a solid material for a magnet as described in the item (c), wherein said solid material is formed by cutting work and/or deformation processing; and

(19) A method as described in the item (16), comprising the step of heat-treating said solid material at least once at a temperature of 100° C. or more but less than a decomposition temperature; and (j) A method of producing a solid material for a magnet as described in any one of the items (1) to (15), (A) to (Z), and (a) to (c), comprising the step of heat-treating said solid material at least once at a temperature of from 100° C. or more but less than a decomposition temperature; and

(20) A part used for a device utilizing a static magnetic field generated from a magnet using a solid material for a magnet as described in any one of the items (1) to (7); and (k) A part used for a device utilizing a static magnetic field from a magnet with a solid material for a magnet as described in any one of the items (8) to (19), (A) to (Z), and (a) to (c); and (l) A device utilizing a static magnetic field from a magnet, wherein a maximum working temperature ($T_{max}$) is 100° C. or more, and said part described in the item (20) or (k) is used.

Figure 6:
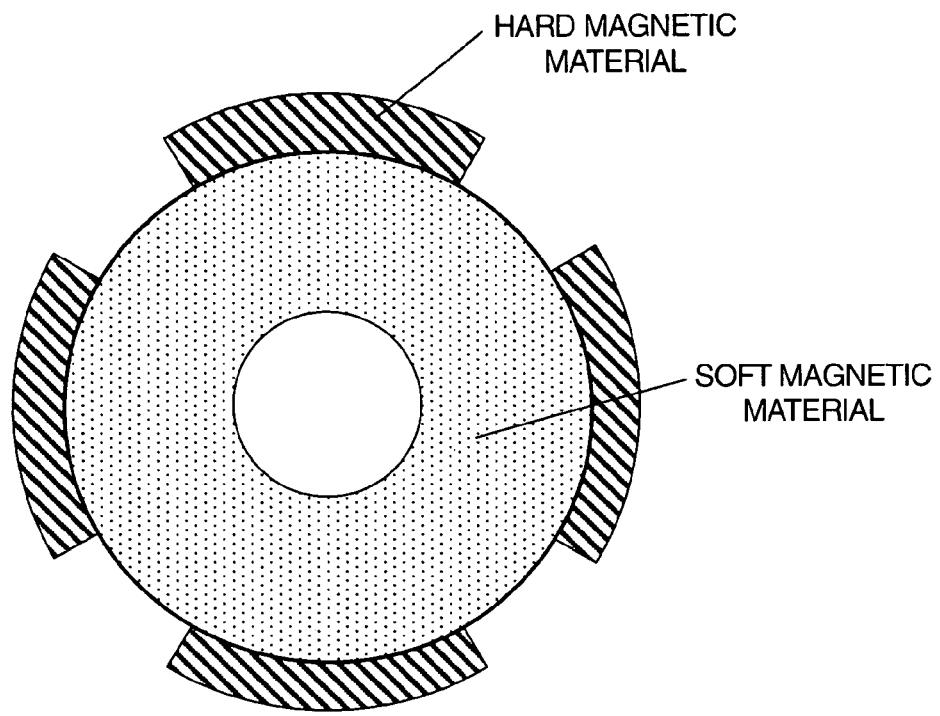
Figure 7:
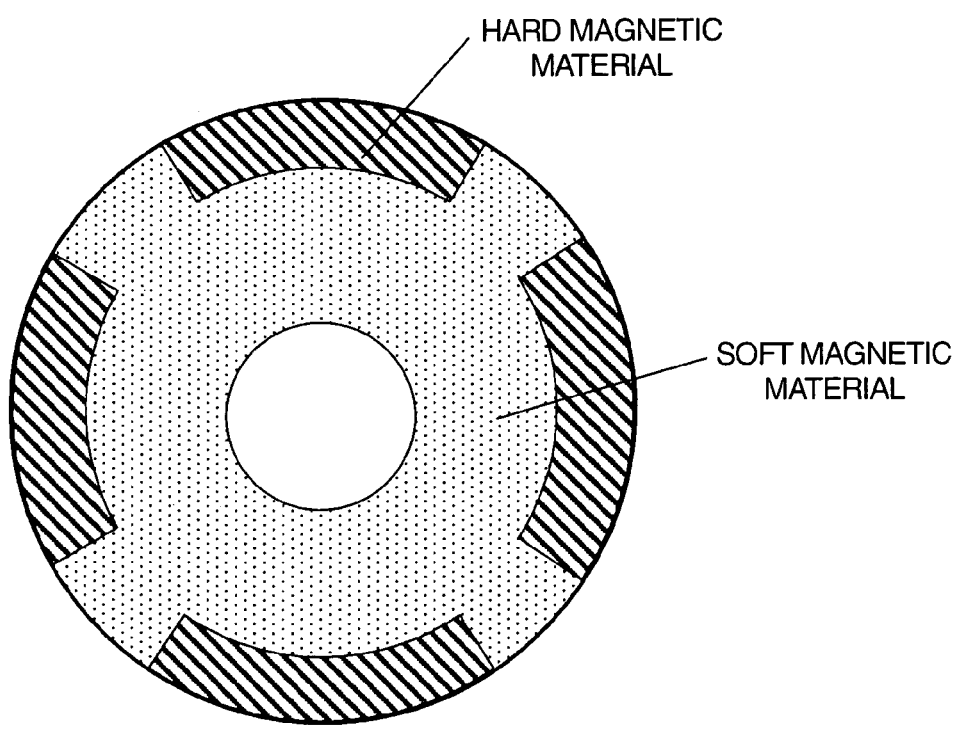
Figure 8:
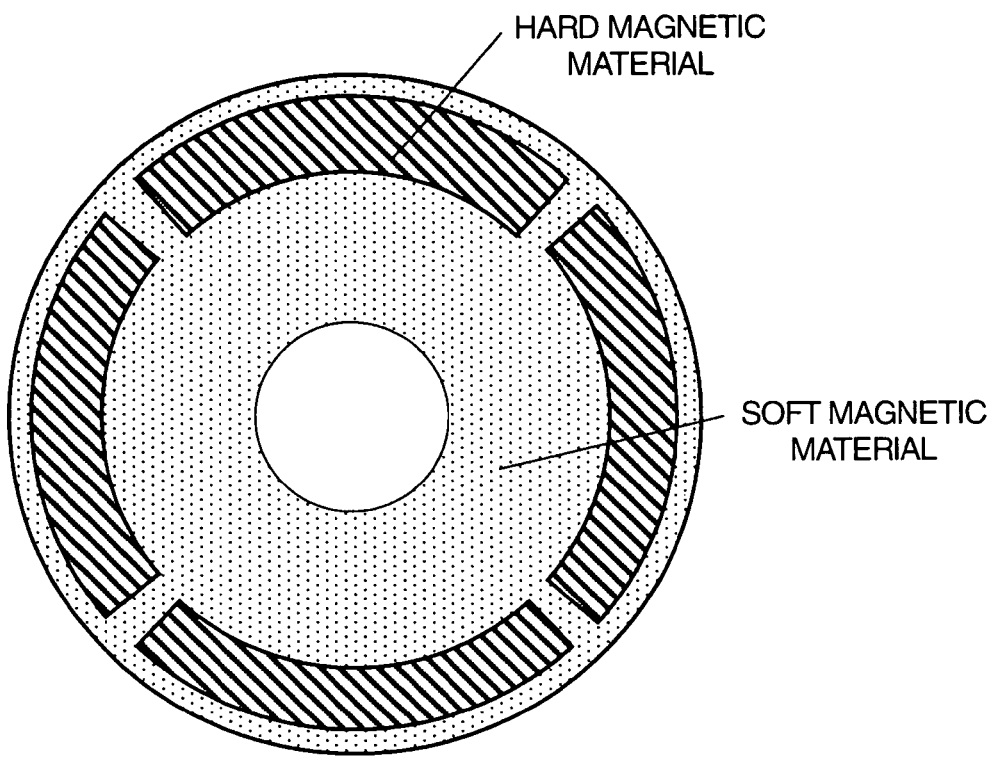
Figure 9:
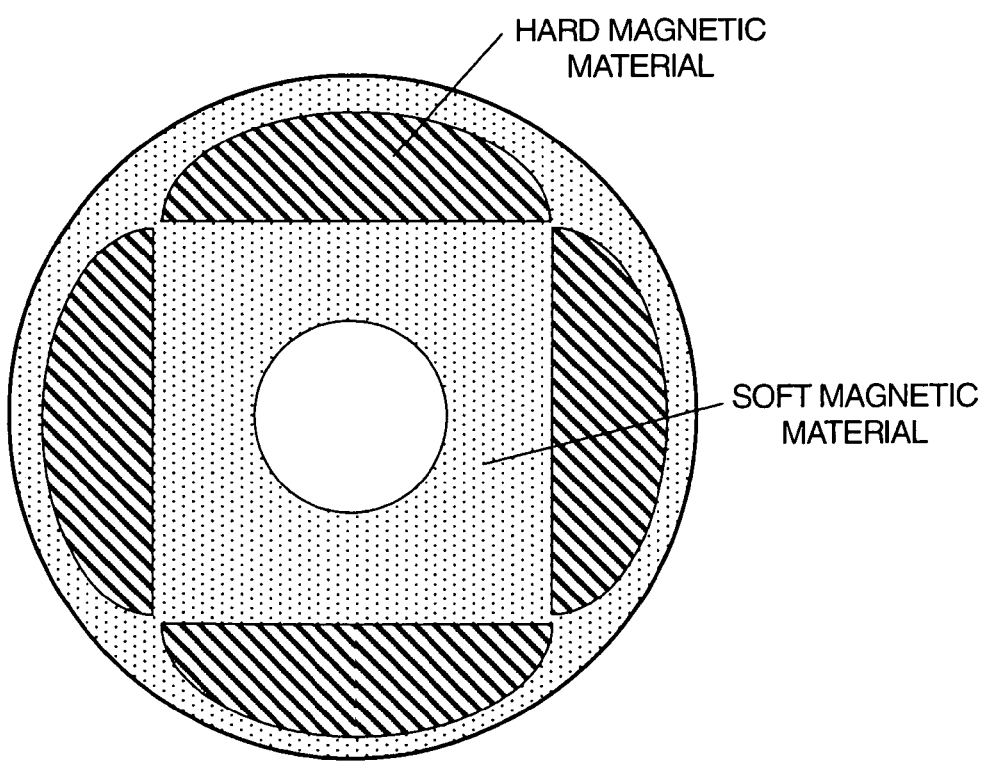
Figure 10:
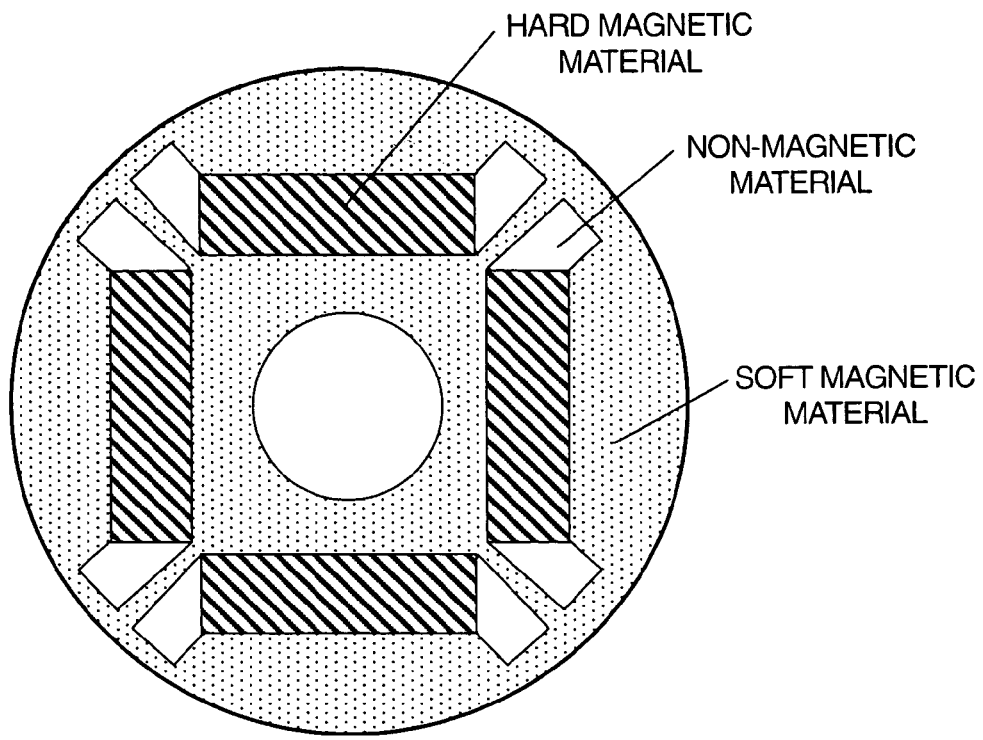
Figure 11:
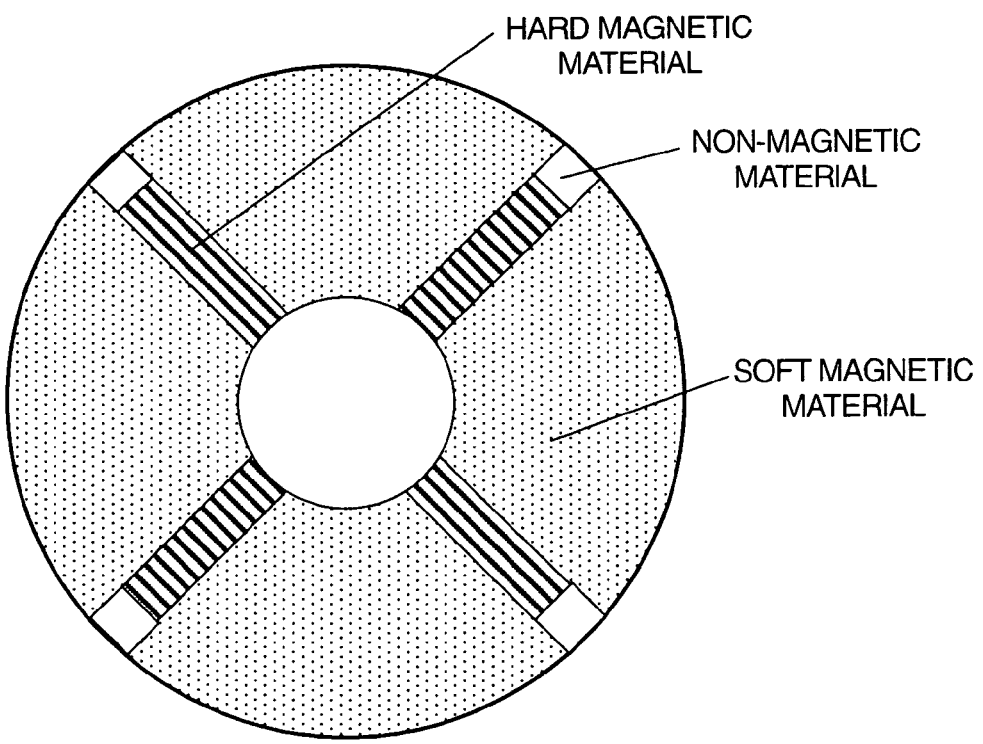
Figure 12:
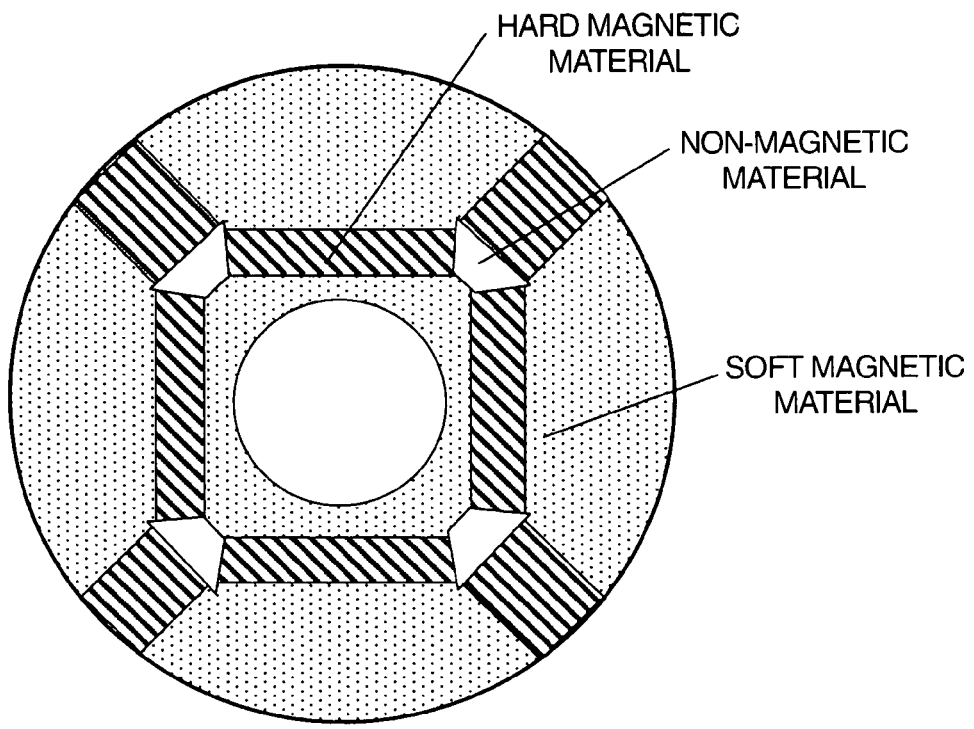
Figure 13:
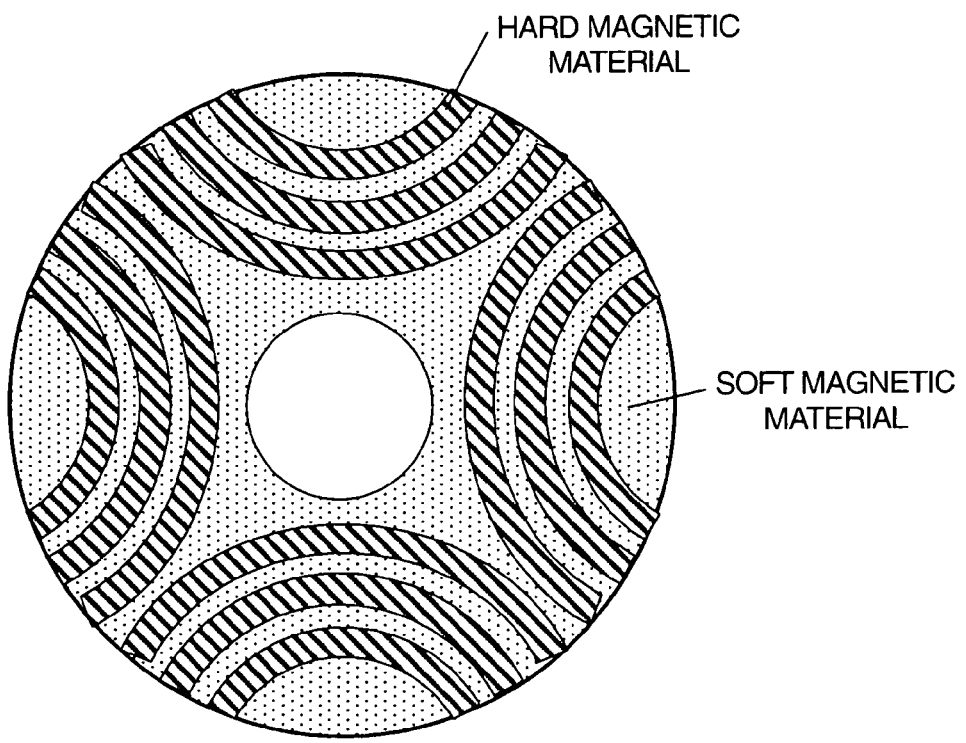
Figure 14:
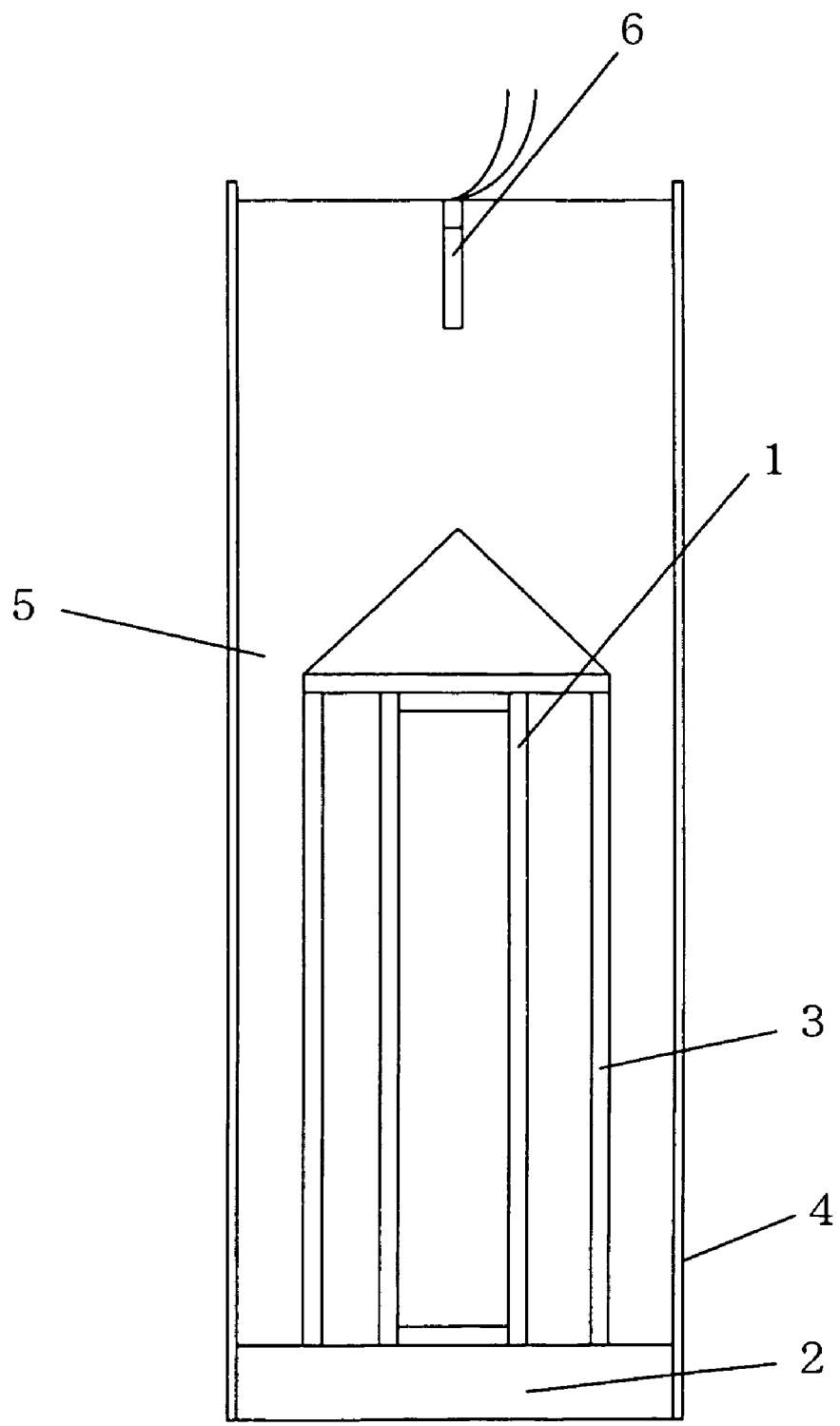
Figure 15:
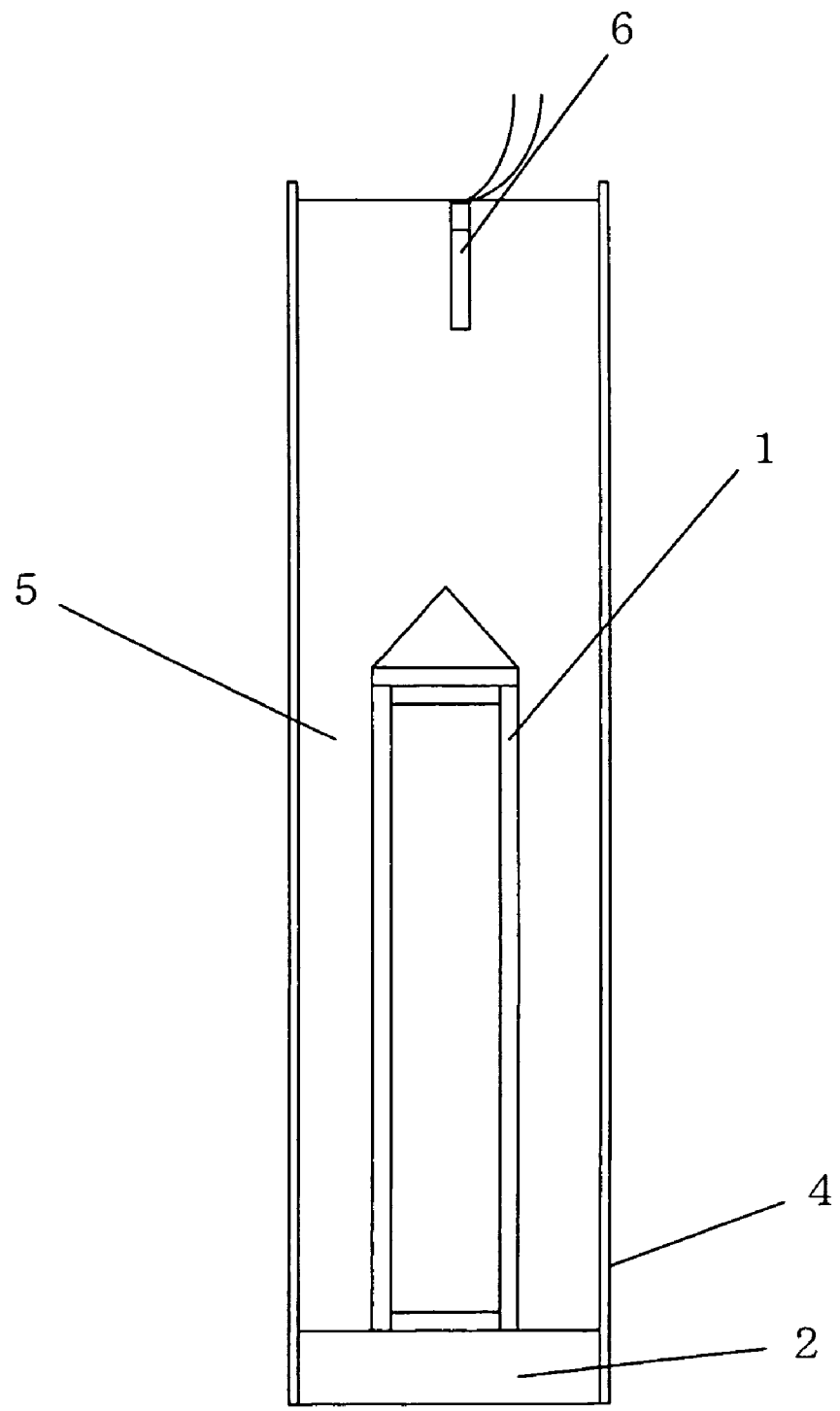

Each of FIGS. 6 and 7 illustrates example of section structures of a rotation axis of a rotor having a surface magnet structure, in the case of using a solid material for a magnet according to the present invention for a permanent-magnet synchronous motor;

Each of FIGS. 8 to 13 illustrates one example of section structures of a rotation axis of a rotor having an embedded magnet structure, in the case of using a solid material for a magnet according to the present invention for a permanent-magnet synchronous motor;

FIG. 14 is a schematic diagram illustrating one example of the means of carrying out a shock-compression method wherein underwater shock-waves are used; and FIG. 15 is a schematic diagram illustrating one example of the means of carrying out a shock-compression method wherein detonation waves from a explosive are directly used, which is used in Comparative Example 2.

BEST MODE FOR CARRYING OUT THE INVENTION

An R—Fe—N—H system magnetic material used for a solid material for a magnet according to the present invention can be prepared according to a publicly known method (See, for example, U.S. Pat. Nos. 5,186,766 and 5,164,104; and Japanese Patent Nos. 2,703,281, 2,705,985, 2,708,568, 2,739,860 and 2,857,476, and the like).

For example, the R—Fe—N—H system magnetic material may be produced by the steps of: preparing a rare-earth/iron alloy using to a high-frequency induction, a rapid quenching, an R/D method, a HDDR method, a mechanical alloying process and/or a mechanical grinding process or the like; coarsely pulverizing the same to a particle size of approximately dozens to hundreds of micrometers; and thereafter subjecting the same to nitrogenation and hydrogenation treatments in an atmosphere of a nitrogen/hydrogen mixed gas, an ammonia/hydrogen mixed gas or the like; and finely pulverizing the same. Some compositions of a magnetic material, some treating methods of an alloy, or some nitrogenation/hydrogenation treatments may not require the step of coarsely pulverizing and/or the step of finely pulverizing.

In the present invention, it is important to bring the raw material into contact with a hydrogen source such as a hydrogen gas, an ammonia gas, a compound including hydrogen, or the like so as to introduce hydrogen as well as nitrogen. That is, the amount of hydrogen in an R—Fe—N—H system magnetic material is preferably included in an amount of 0.01 atomic percentage or more. When the amount of hydrogen is less than 0.01 atomic percentage, since an α-Fe decomposed phase and a rare-earth nitride decomposed phase are formed, undesirably the coercive force is decreased and furthermore corrosion resistance may be lowered. When the amount of hydrogen is included in an amount of 0.1 atomic percentage or more, a raw material for a further preferred solid material for a magnet is formed.

As the crystal structures of an R—Fe—N—H system magnetic material, a rhombohedral crystal having a $Th_2Zn_{17}$-type crystal structure or the like or a similar crystal structure thereto; a hexagonal crystal having a $Th_2Ni_{17}$—, $TbCu_7$— or $CaZn_5$-type crystal structure or the like or a similar crystal structure thereto; and besides a tetragonal crystal having a $R_2Fe_{14}BN_x$-type, $R_2Fe_{14}CN_x$-type or $R(Fe_{1-y}M_y)_{12}N_x$-type crystal structure or the like or a similar crystal structure thereto; are enumerated. The magnetic material has to include at least one of the above crystal structures. It is preferable that among others a rhombohedral crystal having a $Th_2Zn_{17}$-type crystal structure or the like or a similar crystal structure thereto; or a hexagonal crystal having a $Th_2Ni_{17}$—, $TbCu_7$- or $CaZn_5$-type crystal structure or the like or a similar crystal structure thereto; is included in an amount of 50% by volume or more of the whole R—Fe—N—H system magnetic material, and it is most preferable that a rhombohedral crystal having a $Th_2Zn_{17}$-type crystal structure or the like or a similar crystal structure thereto is included in an amount of 50% by volume or more of the whole R—Fe—N—H system magnetic material.

The volume fraction of an R—Fe—N—H system magnetic material to the whole of a solid material for a magnet according to the present invention is preferably set to 50 to 100% by volume. However, when a solid material for a magnet is comprised of a unique R—Fe—N—H system magnetic material, or when the solid material is a composite material with a gas or an organic matter, the volume fraction of the R—Fe—N—H system magnetic material to the whole of a solid material for a magnet may be set to 80 to 100% by volume. When the volume fraction is less than 80% by volume, continuous bindings among magnetic particles are not satisfactory, whereby a solid material for a magnet is not formed. Nevertheless, when in addition to an R—Fe—N—H system magnetic material, a hard magnetic material such as a rare-earth/iron/boron system magnetic material, a soft magnetic material such as Co, and/or a non-magnetic phase such as a metal or an inorganic matter, or the like is included, if a solid-material volume-fraction which is a value consisting of the volume fraction of the additional material mentioned above and the volume fraction of the R—Fe—N—H system magnetic material is in the range of 80 to 100% by volume, it is satisfactory.

The R—Fe—N—H system magnetic material described above is derived as powders having an average particle size of 0.1 to 100 μm so as to be provided as a raw material for a solid material for a magnet. When the average particle size is less than 0.1 μm, the magnetic orientation is deteriorated and the residual magnetic flux density is decreased. Conversely, when the average particle size is larger than 100 μm, the coercive force is decreased so as to come to be poor in practicability. In order to impart an excellent magnetic orientation, an average particle size is more preferably in the range of 1 to 100 μm.

Besides, the R—Fe—N—H system magnetic material is characterized in that the magnetic material has a large magnetic anisotropy as well as a high saturation magnetization and a high Curie point. Therefore, when the magnetic material can be formed as single-crystal powders, it can be easily magnetically aligned in an external magnetic field, whereby it can be formed into a solid material for an anisotropic magnet having superior magnetic properties.

28) Additionally, even if the magnetic material is an R—Fe—N—H system magnetic material including oxygen in addition to hydrogen as follows, it can be likewise used as a solid material for a magnet of the present invention.

(1) A magnetic material, characterized in that it is represented by the general formula:

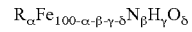

wherein R is at least one element selected from rare-earth elements including Y; and $\alpha$, $\beta$, $\gamma$ and $\delta$ are atomic percentages and $5 \leq \alpha \leq 20$, $10 \leq \beta \leq 25$, $0.01 \leq \gamma \leq 5$ and $1 \leq \delta \leq 10$, respectively; and (2) A magnetic material as described in the item (1), characterized in that said magnetic material has a rhombohedral or hexagonal crystal structure; and (3) A magnetic material as described in the item (1) or (2), wherein an amount of 20 atomic percentage or less of the amount of R and/or Fe is replaced with at least one element(s) selected from the group consisting of Ni, Ti, V, Cr, Mn, Zn, Zr, Nb, Mo, Ta, W, Ru, Rh, Pd, Hf, Re, Os, Ir and B; and (4) A magnetic material as described in any one of the items (1) to (3), wherein an amount of 10 atomic percentage or less of the amount of N and/or H is substituted with at least one element(s) selected from the group consisting of C, P, Si, S and Al; and (5) A magnetic material as described in any one of the items (1) to (4), wherein an amount of 50 atomic percentage or more of the amount of R of the components of said magnetic material is substituted with Sm; and (6) A magnetic material as described in any one of the items (1) to (5), wherein an amount of 0.01 to 50 atomic percentage of the amount of Fe of the components of said magnetic material is replaced with Co; and (7) A magnetic material as described in any one of the items (1) to (6), wherein a grain-boundary or surface of said magnetic material has been reacted with Zn. When an R—Fe—N—H system magnetic material includes oxygen, magnetization is somewhat deteriorated, but oxygen contributes to improvement in a coercive force, and stability of magnetic properties.

One of large features of an R—Fe—N—H system magnetic material is the point that oxidation resistance is relatively high, and rust is difficult to start.

An Nd/Fe/B system sintered magnet is very high in magnetic properties, and is in heavy usage for an actuator such as VCM, and various motors. However, since the surface of the sintered magnet is easily oxidized even in the atmosphere at normal room temperature, the sintered magnet has to be surface-treated by nickel-plating, by coating with an epoxy-resin, or the like for the purpose of rust removal.

On the other hand, in the case of a magnet comprising an R—Fe—N—H system magnetic material, the above-mentioned surface treatment may be either not necessary or simplified. That is, said magnet has not only the advantage in cost, but also the advantage that the torque of a rotational or repetitive motion can be increased when the magnet is utilized as an actuator or a motor, because the gap between a stator and a rotor can be narrowed down by the thickness of a surface layer being low in magnetic properties. Thus, said magnet can make maximal use of the magnetic force. Therefore, for example, even when the value of the $(BH)_{max}$ of said magnet at ordinary temperatures is lower than that of an Nd—Fe—B system magnet, a similar performance thereto can be brought out. In the case of a magnet comprising an R—Fe—N—H system magnetic material, when no surface-treatment is necessary, even if the value of the $(BH)_{max}$ at ordinary temperatures is 200 kJ/m³ or more, a preferred magnet which is excellent in cost performance may be formed, and if the value is 240 kJ/m³ or more, a further preferred magnet may be formed. However, in the case of a solid material for a magnet, having a pinning-type flux reversal mechanism, since a raw-material magnetic powder itself is excellent in thermal stability and corrosion resistance, in particular for high-temperature flat application, even if the value of the $(BH)_{max}$ at ordinary temperatures is less than 200 kJ/m³, the solid material for a magnet is advantageously used. However, even the case, it is preferred that the $(BH)_{max}$ at ordinary temperatures is 100 kJ/m³ or more.

According to the present invention, a first mode of a solid material for a magnet is an R—Fe—N—H system solid material for a magnet, characterized by having a density of higher than 7.45 g/cm³. Since each of a magnetization intensity and a magnetic flux density is in proportion to a packing fraction, the lower the density of the solid material comes to be, the lower the residual magnetic flux density comes to be, whereby the maximum energy product is decreased, generally the larger the packing fraction of the solid material for a magnet comes to be, the more advantageous the solid material is for a high-performance magnet. Furthermore, since the R—Fe—N—H system solid material for a magnet is in the form of powders in many cases, if there are many passthroughs for oxygen which are continuous pores, such as voids, the surfaces of the powders are oxidized and deteriorated, which gives rise to the decrease of the coercive force. Accordingly, depending upon the composition and/or application of the solid material, the density of the solid material has to be satisfactorily increased so as to prevent the penetration of oxygen from the surfaces, and thus the packing fraction has to be 95% or more, and preferably 98% or more, and the packing fraction in particular near the surfaces may have to be nearly 100%. In a combination of the composition and the application of the solid material, wherein oxidization comes to be severe, the density of the solid material for a magnet is preferably larger than 7.45 g/cm³, and more preferably larger than 7.50 g/cm³, and still more preferably larger than 7.55 g/cm³, and most preferably larger than 7.60 g/cm³. Additionally, depending upon the composition of a raw material, when the density of the solid material is larger than 8.0 g/cm³, a phase in addition to a R—Fe—N—H phase having superior magnetic properties is formed, whereby the magnetic properties of the solid material is frequently and inversely decreased. Thus, it is not preferred.

Depending upon the process and/or the condition for producing the solid material for a magnet, the larger the volume of the solid material comes to be, the lower the packing fraction of the internal may come to be. However, even in such a case, if the packing fraction of the surface layer is sufficiently increased and the layer is sufficiently thickened, the solid material can be provided as a practical magnet.

However, when a solid material for a magnet is composed of a unique R—Fe—N—H system magnetic material, and the remainder is the atmosphere, if the density of said solid material is 7.45 g/cm³ or less, even if a magnet having any form and volume is formed, the magnet includes a lot of voids, which often gives rise to a crack and/or a break, and the coercive force may be frequently decreased as mentioned above. Thus, it is not preferred.

According to a method of the present invention, when an only R—Fe—N—H system magnetic material is used as a raw material so as to produce a solid material for a magnet having a volume of 5 cm³ or less, the solid material for a magnet having a density of larger than 7.60 g/cm³ can be easily derived. However, when a solid material for a magnet having a volume of 0.1 m³ was produced, depending upon the morphology of the solid material, a moiety having a density of 7.45 g/cm³ or less may be formed within the solid material. However, even in such a case, when a solid material for a magnet, a part of the surface layer portion of which has a density of larger than 7.60 g/cm³, is formed, the solid material has oxidization resistance and superior magnetic properties, and can be said to belong to the category of a solid material for a magnet of the present invention.

On the other hand, a $Th_2Zn_{17}$-type R—Fe—N system magnetic material having no hydrogen, when the magnetic properties will be optimized, the amount of nitrogen comes to be less than 3 per an $R_2Fe_{17}$, whereby a thermodynamically unstable $R_2Fe_{17}N_{3-\Delta}$-phase is formed. This phase is easily decomposed into an α-Fe decomposed phase and a rare-earth nitride decomposed phase with thermal and mechanical energies. Consequently, a high-performance solid material for a magnet can not be formed according to a conventional shock-waves compression method.

On the contrary, when the amount of hydrogen is controlled within the range as defined above, generally the main phase is formed into an $R_2Fe_{17}N_3H_x$ phase which is thermodynamically stable, or an $R_2Fe_{17}N_{3+\Delta}H_x$ phase which includes an excessive amount of nitrogen, wherein x is generally in the range of about 0.01 to 2, whereby decomposition into an α-Fe decomposed phase or a rare-earth nitride decomposed phase with thermal and mechanical energies is remarkably inhibited as compared with the one in the case of the $Th_2Zn_{17}$-type R—Fe—N system magnetic material.

35) This is nothing but an important information to derive a solid material for a magnet, which has a high density and superior magnetic properties, with excellent thermal stability and oxidation resistance.

An R—Fe—N—H system magnetic material used in the present invention can form a wide variety of magnetic materials, such as a nucleation type, pinning type, exchange-spring type, or exchange coupling type magnetic material, which are different in the mechanism of magnetic reversal from one another into a solid material for a magnet. Since each of the above-mentioned magnetic materials causes a decomposition reaction at a temperature of higher than 600° C., all the magnetic materials can not be formed into a solid material for a magnet according to a sintering method wherein densification is achieved at a high temperature. All the magnetic materials are a material group which it is very useful to form by using a shock compression method according to the present invention.

As described above, decomposition of an R—Fe—N—H system magnetic material with thermal and mechanical energies is remarkably inhibited. However, if this magnetic material is decomposed whereby a rare-earth nitride phase and an α-Fe decomposed phase having a large particle size of larger than 100 nm are formed, even though a large amount of expensive rare-earth elements are included, the α-Fe decomposed phase acts as the magnetic seed, whereby the coercive force is remarkably decreased. Thus, it is not preferred.

Therefore, when as a secondary phase to an R—Fe—N—H system magnetic material, a soft magnetic phase comprising Fe; Co; a Fe—Co; a Fe—Ni such as Permalloy; a Fe—Co—Ni; a nitride thereof; and furthermore an alloy or compound of one or more of said components and one or more of said M (metal) components; or the like is included in a magnet, the soft magnetic phase is prepared so that the particle size or thickness of the soft magnetic phase of about 5 to 100 nm can be derived, whereby a practical coercive force can be maintained, and the amount of an expensive rare-earth element(s) can be saved, and thus a magnet having a high cost performance can be derived.

These soft-magnetic secondary phase has the effect that the residual magnetic flux density of, in particular an R—Fe—N—H system magnetic material is enhanced. However, when the particle size or thickness of the soft magnetic phase is less than 5 nm, the saturation magnetization is decreased, and when the particle size or thickness thereof is larger than 100 nm, the anisotropy which is derived due to a coupling by exchange interaction between a soft magnetic phase and a hard magnetic phase, and a coupling by exchange interaction between soft magnetic phases does not come to be maintained, and the secondary phase acts as the seed of a diamagnetic domain, whereby the coercive force is remarkably decreased. Thus, it is not preferred.

In order to achieve this fine structure, as a method of producing an R—Fe raw material, a publicly known method wherein an M component(s) is added to the R—Fe raw material, and an R—Fe-M raw material is derived according to a rapid quenching method; a publicly known method such as a mechanical alloying process or a mechanical grinding process; a method of producing an R—Fe or R—Fe-M raw material according to a pulverizing process corresponding to the above process; or the like can be employed.

38) Additionally, in this case, the amount of the soft magnetic secondary phase is preferably in the range of 5 to 50% by volume. When it is less than 5% by volume, the coercive force is somewhat increased, but the residual magnetic flux density is not very increased as compared with the one in the case of the single R—Fe—N—H system material. On the other hand, when it is larger than 50% by volume, inversely the residual magnetic flux density is increased, but the coercive force is remarkably decreased. In any event, a high $(BH)_{max}$ can not be achieved. The amount of the soft magnetic phase is more preferably in the range of 10 to 40% by volume.

Furthermore, by mixing one or two or more of hard magnetic powders such as a rare-earth/iron/boron system magnetic material (for example, an Nd—Fe—B system magnetic material), a rare-earth/cobalt system magnetic material (for example, a $SmCo_5$ system or $Sm_2CO_{17}$ system magnetic material), or a ferritic magnetic material in an amount of within 50% by volume or less with an R—Fe—N—H system magnetic material, a solid material for a magnet wherein various practical requirements such as magnetic properties, thermal stability, and cost are optimized depending upon applications can be derived.

39) Generally the more a rare-earth/iron/boron system magnetic material is included in a solid material for a magnet, the higher the whole magnetic properties come to be, but the corrosion resistance is decreased and the cost comes to be higher, while the more a rare-earth/cobalt system magnetic material is included therein, the better the thermal stability is improved, but the magnetic properties are deteriorated and the cost comes to be higher, while the more a ferritic magnetic material is included therein, the lower the cost comes to be, and the temperature characteristics are improved, but the magnetic properties are remarkably deteriorated. When an R—Fe—N—H system magnetic material is mixed with a different magnetic material(s) which is extremely different in particle size from the R—Fe—N—H system magnetic material, the advantage that the conditions for increasing the packing fraction are broadened out is derived.

In a solid magnetic material for magnet of the present invention, for the purpose of forming a magnet having, in particular, a high coercive force and a high rectangularity ratio, a non-magnetic phase can be disposed at grain boundaries.

As the methods of carrying out the above, publicly known methods starting with Japanese Patent No. 2,705,985, for example, a method wherein magnetic powders and a non-magnetic component(s) are mixed, and heat-treated; a method wherein the surfaces of magnetic powders are subjected to a plating-treatment; a method wherein the surfaces of magnetic powders are coated with a non-magnetic component(s) according to various vapor deposition methods; and a method wherein magnetic powders are treated with an organic metal, and said organic metal is photolyzed, whereby the surfaces of the powders are coated with the metal component; can be enumerated. Furthermore, a method wherein an R—Fe—N—H system magnetic material and a non-magnetic component(s) are mixed, and subjected to compression molding, and thereafter compressed with shock waves can be also employed.

As the non-magnetic component, both an inorganic component and an organic component can be used, and a metal having a low melting point of 1000° C. or less, and preferably 500° C. or less, such as Zn, In, Sn or Ga is preferred. When Zn among others is used, the coercive force is exponentially enhanced, and thermal stability also is enhanced. In order to achieve superior magnetic properties, the volume fraction of the non-magnetic phase, including the amount of the non-magnetic phase as previously included in the R—Fe—N—H system magnetic material is preferably 10% by volume or less, and more preferably 5% by volume or less, and most preferably 3% by volume or less. Besides, when it is less than 0.01% by volume or less, the effect of the non-magnetic phase on the coercive force can be scarcely found.

42) By combining a solid material for a magnet of the present invention with a soft magnetic solid metallic material and integrating these materials, higher cost performance can be realized. By combining a Fe material, a Fe—Co material, a silicon steel-plate, or the like with an R—Fe—N—H system solid material for a magnet, the magnetic flux density can be enhanced, and furthermore, by laminating the above-mentioned material, Ni or a Ni-containing material on the surface of the solid material, the workability and/or the corrosion resistance also can be further improved.

Figure 1:
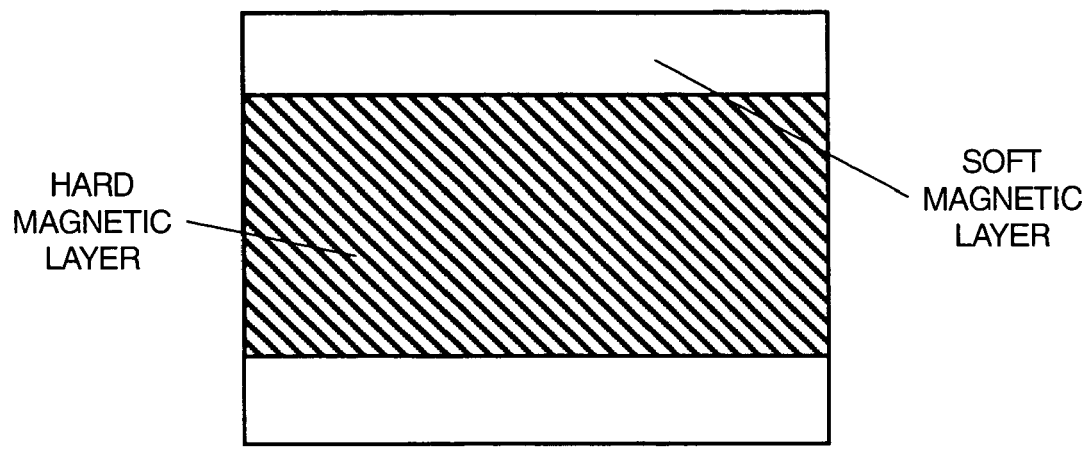
FIG. 1 is a schematic diagram illustrating one example of cross-section of a solid material for a magnet which was derived by bonding a rare-earth/iron/nitrogen/hydrogen system magnetic material and a soft-magnetic solid metal so as to make each material integrated with the other.
Figure 2:
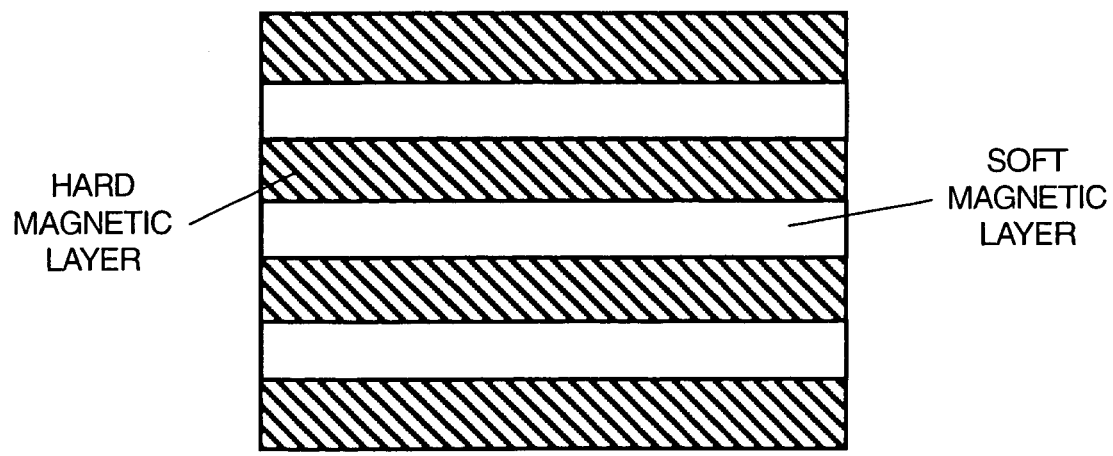
FIG. 2 is a schematic diagram illustrating an exemplary cross-section of a solid material for a magnet wherein a rare-earth/iron/nitrogen/hydrogen system magnetic material layer and a soft-magnetic layer are alternately and monolithically laminated.

FIGS. 1 and 2 illustrate examples wherein an R—Fe—N—H system solid material for a magnet and a soft-magnetic material are bonded and integrated with each other FIG. 1 is a schematic diagram illustrating one example of cross-sections of the solid material for a magnet which was derived by monolithically bonding an R—Fe—N—H system magnetic material (a hard magnetic layer) and a soft-magnetic solid metal (a soft magnetic layer).

FIG. 2 is a schematic diagram illustrating one example of a cross-section of a solid material for a magnet wherein an R—Fe—N—H system magnetic material layer (a hard magnetic layer) and a soft-magnetic layer are alternately laminated and are made monolithic. By constituting the magnet as shown in FIG. 2, the cost down of the magnet can be achieved without decreasing the surface magnetic flux density of the magnet.

When powders of an R—Fe—N—H system magnetic material and a soft magnetic bulk-material or powder are simultaneously loaded without mixing both materials, and are subjected to shock-wave compression, since the solidification of the R—Fe—N—H system magnetic material and the integration of the same with the soft magnetic material can be simultaneously carried out, and none of cutting-out, welding, or bonding with an adhesive agent and the like is necessary for the purpose of the integration of the materials at a post-process, and thus a merit in cost is large, which is a distinguishing feature of the present invention.

Figure 3:
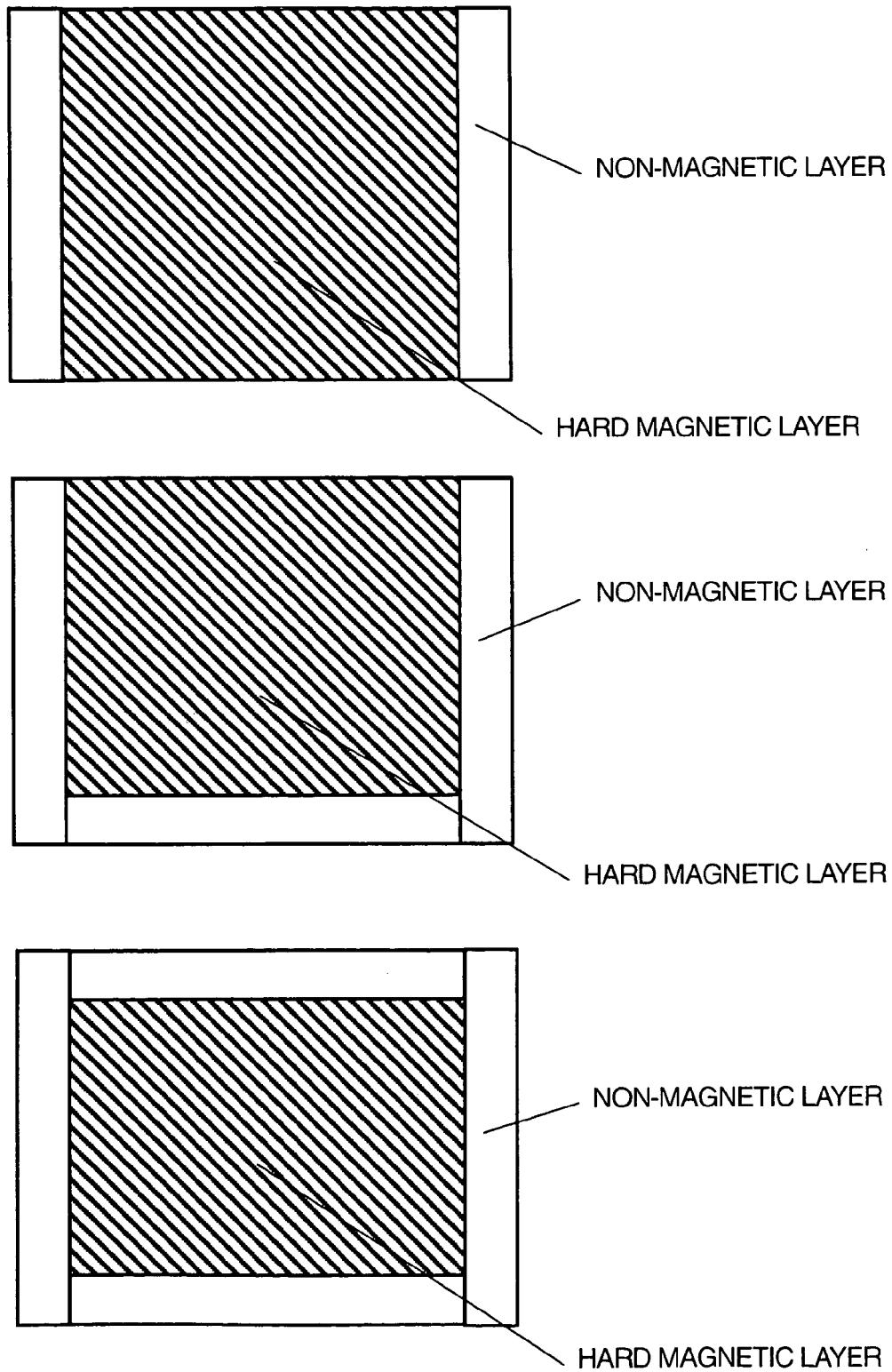
FIG. 3 is a schematic diagram illustrating an exemplary cross-section of a solid material for a magnet wherein a part or the whole of the periphery of a layer mainly comprising a rare-earth/iron/nitrogen/hydrogen system magnetic material is covered with a non-magnetic solid material.

As shown in FIG. 3, a part or the whole of the surface of a solid material for a magnet of the present invention may be covered with a non-magnetic solid material.

45) FIG. 3 illustrates a cross-section of a solid material for a magnet which is covered with a non-magnetic solid material. For a solid material for a magnet, all the surface of which can be covered with a non-magnetic material, since corrosion resistance is also enhanced, it may be advantageous to be covered with the non-magnetic solid material, even at the some sacrifice of magnetic properties, in order to use the solid material for a magnet in a harsh environment subject to high temperature and high humidity. As the non-magnetic solid material, an organic matter, polymer, inorganic matter or non-magnetic metal, having a high decomposition-temperature and/or a high melting point, can be enumerated. In an application wherein in particular thermal-stability is required, covering with a non-magnetic metal or an inorganic matter is preferred. Also in this case, when powders of an R—Fe—N—H system magnetic material and a non-magnetic solid material or powder are simultaneously loaded without mixing both materials, and are subjected to shock-wave compression, the solidification of the R—Fe—N—H system magnetic material and the integration of the same with the non-magnetic material can be simultaneously carried out.

46) In order to provide anisotropy for a solid material for a magnet so as to make a magnet, it is commonly subjected to magnetization. Then, the solid material for a magnet is provided with a great shock, whereby even the compactly solidified R—Fe—N—H system solid material for a magnet may be cracked and/or chipped. Accordingly, depending upon a magnetizing field and/or a magnetizing method, it is preferred to cover a part or the whole of the surface of the magnet with a non-magnetic solid material so as to provide a high impact-resistant solid material for a magnet.

Figure 4:
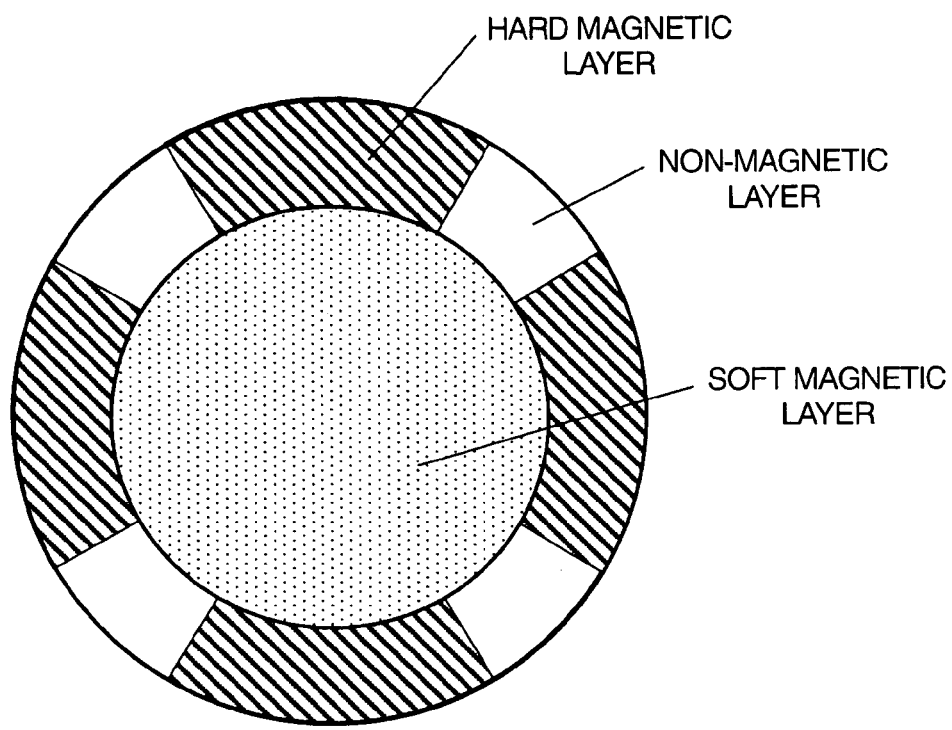
FIG. 4 is a schematic diagram illustrating an exemplary cross-section of a solid material for a magnet.

FIG. 4 illustrates one example of a cross-section of another solid material for a magnet of the present invention. That is, by combining an R—Fe—N—H system magnetic material with a soft magnetic material and a non-magnetic material, a solid material for a magnet as shown in FIG. 4 can be formed.

A solid material for a magnet of the present invention is characterized by excellent magnetic properties after magnetization. In case of the R—Fe—N—H system magnetic material being a magnetic anisotropic material, it is preferred that magnetic powders are subjected to magnetic orientation at a magnetic field of 80 kA/m or more, and preferably 800 kA/m or more, when subjected to compression molding. Furthermore, it is preferred to increase a residual magnetic flux density and a coercive force by magnetizing the compression molded material at a static magnetic field or a pulsed magnetic field of 1.6 MA/m or more, and more preferably 2.4 MA/m or more after compression molding with shock waves.

In case of the R—Fe—N—H system magnetic material being a magnetic isotropic material, no magnetic alignment is necessary when subjected to compression molding. However, the compression molded material has to be magnetized as described above so as to satisfactorily and magnetically make the same anisotropic.

Besides, when this solid material for a magnet is magnetized and used as a magnet, depending upon the application, various shapes are required. This solid material for a magnet includes no resin binder, and is high in density, and can be easily processed into an arbitrary shape through machining and/or plastic forming by means of an ordinary processing machine. In particular, a major characteristic of the solid material is that it can be easily processed into a prismatic, cylindrical, ring, discoid or tabular shape having an industrial utility value. It is also possible that once this solid material is processed into the above-mentioned shape, and thereafter further cutting work or the like is applied to the same so as to form a square pole having a tegular shape or an arbitrary bottom-shape, or the like. That is, this solid material for a magnet can be formed from an arbitrary shape into any morphology surrounded by a curved surface and/or a flat surface by easily machining and/or plastic forming to the solid material, wherein the wording "machining" means shaping for a common metallic material, which is machine work by means of a saw, a turning machine, a milling machine, a drilling machine, a grinding stone or the like, while plastic forming means press dies-cutting or press molding, rolling, explosive forming and the like. Additionally, this solid material for a magnet can be subjected to heat-treatment, such as annealing, at a temperature of the decomposition temperature of the magnetic material powders or less, in order to remove a strain in the solid material after cold-working. Depending upon a composition of the magnetic material powders, plastic forming can provide with magnetic anisotropy or can enhance the magnetic anisotropy thereof. Furthermore, by combining plastic forming with heat treatment, the coercive force can be controlled. Heat treatment also can be employed after shock-wave compression as described later, so that the various magnetic properties can be enhanced by annealing the solid material to remove the distortion caused and/or by controlling a fine structure. Besides, for example, when a metal having a low melting-point is added to an R—Fe—N—H system magnetic material, heat treatment may be carried out in parallel with powder compacting, or before or after the same so as to strengthen temporary bonds among magnetic powders, whereby a subsequent operation can be facilitated, wherein a temperature for heat treatment is in the range of from 100° C. or more to less than the decomposition temperature. In addition to the examples mentioned above, before, during and/or after each of the steps of producing a solid material for a magnet of the present invention, heat treatment can be carried out.

According to the present invention, a second mode of a solid material for a magnet is a material including an R—Fe—N—H system magnetic material in an amount of 80 to 97% by volume. This mode intends to provide a solid material for a magnet, which is excellent in magnetic properties and in the stability of the properties in spite of lightness in weight. Thus this second mode is quite different from the first mode in their objects. In the second mode, a moiety in an amount of 3 to 20% by volume in addition to an R—Fe—N—H system magnetic material may be atmospheric air, and may be a vacuum, or an element, a compound or a mixture thereof having a density of 6.5 g/cm³ or less, depending upon the application of this material and/or the composition thereof.

The density of a solid material for a magnet which is a second mode of the present invention is preferably in the range of 6.15 to 7.45 g/cm³ in order to make good use of the features of this solid material. Even when the density of the solid material is less than 6.15 g/cm³, if the components of an R—Fe—N—H system magnetic material are present in an amount of 80% by volume or more, the density may be preferred. Furthermore, allowing that an R—Fe—N—H system magnetic material are present in an amount of 97% by volume or less, the density of the solid material may come to be larger than 7.45 g/cm³, which may not make good use of the features of a solid material for a magnet of the present invention, which is lighter in weight as compared with an existing solid magnet. For example, even when a moiety in addition to a $Sm_2Fe_{17}N_3H_{0.1}$ magnetic material whose true density is 7.69 g/cm³ (See Trans. Magn., MAG-28, p.2326; and Powder Diffraction File WZ1430 by ICDD), is a gas having such a low density as is sufficiently negligible, if the content of the magnetic material is in the range of 80 to 97% by volume, the density of the solid material will come to be in the range of 6.15 to 7.46 g/cm³.

The expression "a true density" as herein referred to means a density (w/v) as determined on the basis of the volume (v) of an R—Fe—N—H unit cell which is derived by X-ray analysis and the sum (w) of atomic weights of atoms constituting the unit cell, which is generally referred to as "an X-ray density ($D_x$)". Furthermore, the density ($D_m$) of a solid material for a magnet can be determined according to a macro-method such as Archimedean method or Volume method. Incidentally, a solid material for a magnet of the present invention is a polycrystalline substance, and may include a surface phase different from an R—Fe—N—H main phase, and thus even in a state wherein the solid material includes no void, the $D_m$ does not always correspond to the $D_x$. Therefore, in the present invention, judging the degree of packing in the solid material for a magnet by using the density ($D_m$) itself as a guide is frequently more suitable rather than judging the same based upon the packing fraction ($D_m/D_x$).

Depending upon the composition of an R—Fe—N—H system magnetic material and the sort of a moiety in addition to the magnetic material, the relationship between the volume fraction of the R—Fe—N—H system magnetic material and the density of the same is changed. On the other hand, in order to derive a solid material for a magnet having an excellent thermal-stability, the content of the magnetic material has to be of 80% by volume or more, while in order to derive a lightweight solid material for a magnet, the density of the solid material has to be 7.45 g/cm³ or less. Thus, a more preferred solid material for a magnet includes an R—Fe—N—H system magnetic material in an amount of 80 to 97% by volume, and has a density in the range of 6.15 to 7.45 g/cm³.

With regard to the still more preferred range of each of the volume fraction of an R—Fe—N—H system magnetic material and the density of a solid material for a magnet, for an application wherein thermal-stability is in particular required, the volume fraction range of 83 to 97% by volume and the density range of 6.35 to 7.45 g/cm³ are selected, while in order to derive a lightweight magnet which is remarkably excellent in mechanical strength, magnetic properties and thermal stability, the volume fraction range of 85 to 96% by volume and the density range of 6.50 to 7.40 g/cm³ are selected.

In a solid material for a magnet of the present invention, a component in addition to an R—Fe—N—H system magnetic material is preferably an element, a compound or a mixture thereof having a density of 6.5 g/cm³ or less. When the component is an element having a density of larger than 6.5 g/cm³, even when the volume fraction of the magnetic material is limited to 80% by volume, the density of the whole solid material for a magnet is frequently larger than 7.45 g/cm³, and thus no use of the features of the second mode of the present invention are made. Thus such an element is not preferred.

As elements having a density of 6.5 g/cm³ or less, Al, Ar, B, Be, Br, C, Ca, Cl, F, Ga, Ge, H, He, Kr, Mg, N, Ne, O, P, S, Se, Si, Te, Ti, V, Y, Zr and the like can be enumerated. Furthermore, even when a compound and/or an alloy of one or more of the above elements, and/or an element having a density of 6.5 g/cm³ or more are included in a solid material for a magnet, the one having a density of 6.5 g/cm³ or less in the form of a compound and/or an alloy, such as a Mn—Al—C or an Al—Cu—Mg alloy, or the one having a density of 6.5 g/cm³ or less in the form of a mixture such as Bi—Al having a volume ratio of 1:1, or the like is preferably selected as a component in addition to the magnetic material.

A moiety in addition of an R—Fe—N—H system magnetic material can be a gas having a density of 6.5 g/cm³ or less, for example, at least one selected from the group consisting of an inactive gas such as nitrogen gas, He, Ar or Ne, and a reducing gas such as hydrogen gas or ammonia gas. A magnetic-material/gas composite solid material for a magnet produced from the above materials is characterized by lightness in weight.

Besides, a moiety in addition of an R—Fe—N—H system magnetic material can be preferably selected from the group consisting of an oxide such as MgO, $Al_2O_3$, $ZrO_2$, $SiO_2$ or ferrite, a fluoride such as $CaF_2$ or $AlF_3$, a carbide such as TiC, SiC or ZrC, a nitride such as $Si_3N_4$, ZnN or AlN, and the like, which have a density of 6.5 g/cm³ or less. In addition, the moiety can be selected from the group of consisting of a hydride, a carbonate, a sulfate, a silicate, a chloride, a nitrate, and a mixture thereof, which have a density of 6.5 g/cm³ or less.

Among others, in particular, a hard magnetic ferrite such as a $BaO.6Fe_2O_3$ system, a $SrO.6Fe_2O_3$ system, a La-added ferrite, and/or as the case may be, a soft magnetic ferrite such as a Mn—Zn system or a Ni—Zn system, or the like can be included in a magnetic-material/inorganic-matter composite solid material for a magnet, whereby the magnetic properties and/or the stability of the properties can be enhanced. These magnetic-material/inorganic-matter composite solid materials for a magnet are excellent in mechanical strength, thermal stability and magnetic properties.

Furthermore, a moiety in addition of an R—Fe—N—H system magnetic material may be an organic matter having a density of 6.5 g/cm³ or less. For example, an organic matter having a glass transition point, a softening point, a melting point and a decomposition point of 100° C. or more can be employed as a component of a solid material for a magnet of the present invention. As the above organic matter, for example, a resin as referred to as "engineering resin" such as polyamide, polyimide, polyphenylene oxide, or wholly aromatic polyester; and a heat-resistant thermoplastic or thermosetting resin such as a liquid crystal polymer, epoxy resin, phenol-modified epoxy resin, unsaturated polyester resin, alkyd resin, or a fluorine-contained resin; as well as an organosilicon compound such as a silicone rubber; and an organometallic compound such as a coupling agent or a lubricant can be enumerated.

However, the volume fraction of the above-mentioned organic matter is 20% by volume or less, and preferably 17% by volume or less, and more preferably 10% by volume or less, and most preferably 5% by volume or less, which should not hinder an R—Fe—N—H system magnetic material from being solidified by metallic bonds. This magnetic-material/organic-matter composite solid material for a magnet is excellent in shock resistance in spite of lightness in weight. However, in a severe environment at an elevated-temperature and high-humidity, such a magnetic-material/organic-matter composite solid material for a magnet may be not to be used.

A moiety in addition to an R—Fe—N—H system magnetic material of a solid material for a magnet of the present invention may coincidentally include two or more selected from the group consisting of the above-mentioned gases, inorganic matters, and organic matters. For example, an R—Fe—N—H system magnetic material/inorganic matter/organic matter composite solid material for a magnet comprising voids which are atmospheric air, and a silicone rubber wherein silica is dispersed; and an R—Fe—N—H system magnetic material/gas/inorganic matter/organic matter composite solid material for a magnet comprising voids filled with nitrogen gas which is an inactive gas, and a silicone rubber wherein silica is dispersed; can be enumerated as such a solid material for a magnet. It is desired that these are properly used, making good use of the features of each component.

A solid material for a magnet of the present invention has further desirably the relationship:

$$B_r \leq \mu_o H_{cJ}(P_c+1)(11000-50T_{max})/(10000-6T_{max})$$

wherein $B_r$ is the residual magnetic flux density at normal room temperature, $H_{cJ}$ is the coercive force at normal room temperature, $P_c$ is the permeance coefficient when said solid material is used as a magnet, $T_{max}$ is the maximum working temperature, and $\mu_o$ is the absolute permeability of vacuum.

The relational expression described above is a formula defining the conditions of said solid material wherein a magnet causes no remarkable demagnetization, and the meaning thereof will be complemented as follows, wherein the wording "remarkable demagnetization" indicates irreversible and large demagnetization. For example, it refers to such demagnetization as exceeds −20% in demagnetization factor within 1000 hours.

The H-coordinate of a critical point on a B—H curve which shows the change of the magnetization of a magnet to the opposing magnetic field comes to be approximately the value of $H_{cJ}$ when the rectangularity ratio is approximately 100%. When the operating point of the magnet is on the side of a magnetic field higher than the critical point, the magnet is rapidly demagnetized, whereby the performance of the magnet can not be effectively achieved, and thus the operating point should be on the side of a magnetic field lower than the critical point. Therefore, when the ratio of the magnetic flux density to the demagnetization factor depending upon the shape of a magnet is taken as internal permeance coefficient ($P_{cO}$), and the smallest permeance coefficient in permeance coefficients at individual operating points is taken as $P_c$, said permeance coefficients depending upon the magnitude of the opposing magnetic field which is applied to a magnet in operation after the solid material is incorporated as the magnet in a magnetic circuit or a device, and the value of a smaller one selected from $P_{cO}$ and $P_c$ is taken as $P_{cmin}$, if at least the following expression (1) is not satisfied, a remarkable demagnetization will be caused:

$$\frac{(B_r - \mu_0 H_{CJ})}{\mu_0 H_{CJ}} \leq P_{Cmin.} \quad (1)$$

The expression (1) is a conditional expression at room temperature, which can be transformed by using the temperature coefficient $[\alpha(B_r)]$ of the residual magnetic flux density at a temperature of T° C. and the temperature coefficient $[\alpha(H_{cJ})]$ of the coercive force at the temperature into the following expression (2):

$$B_r\left\{\frac{1+\alpha(B_r)\times(T-25)}{100}\right\} \leq (P_C+1)\mu_0 H_{CJ}\left\{\frac{1+\alpha(H_{CJ})\times(T-25)}{100}\right\}, \quad (2)$$

whereby a condition under which no remarkable demagnetization is caused can be determined.

Hereupon, when $P_{cO}$ is smaller than $P_c$ and even if the solid material has been magnetized, as soon as the magnetic field is removed, the solid material is demagnetized, remarkable demagnetization can be avoided by previously incorporating a magnet in a yoke and thereafter subjecting the solid material to magnetization. However, if at least the condition defined by the expression (2) is not satisfied, remarkable demagnetization induced by using the magnet can not be avoided.

Depending upon the composition of an R—Fe—N—H system magnetic material and/or the temperature range thereof, the value of each of $\alpha(B_r)$ and $\alpha(H_{cJ})$ is varied, and $\alpha(B_r)$ is varied at a rate of about −0.06%/° C., and $\alpha(H_{cJ})$ is varied at a rate of about −0.5%/° C. The value of $\alpha(H_{cJ})$ is larger in absolute value as compared with that of $\alpha(B_r)$ and both are negative values, and thus the higher T is, the narrower the range of the combination of positive values $(B_r, H_{cJ})$ satisfying the expression (2) becomes. Accordingly, when a magnet comprising a solid material for a magnet of the present invention is used under the condition of permeance coefficient ($P_c$), the demagnetization of the magnet can be alleviated by controlling the value of each of $B_r$ and $H_{cJ}$ within the range defined by the expression (2), which is determined by $T_{max}$° C. which is the maximum temperature in operation.

With the substitution $T=T_{max}$, $\alpha(B_r)=-0.06$ and $\alpha(H_{cJ})=-0.5$, the expression (2) can be rearranged to derive the following expression (3):

$$B_r \leq \frac{\mu_0 H_{CJ}(P_C+1)(11000-50T_{max.})}{(10000-6T_{max.})} \quad (3)$$

That is, if the solid material is formed into a magnet, and the expression (3) is satisfied with $B_r$, $H_{cJ}$, $P_c$ and $T_{max}$, the magnet can be said to be such a magnet as no remarkable demagnetization will be caused. Furthermore, according to the expression (3), the larger $H_{cJ}$ becomes, the larger the possible value of $B_r$ becomes. In order to form a magnet having high thermal-stability and superior magnetic properties, it is preferred to form a solid material for magnet, having an $H_{cJ}$ of larger than 0.62 MA/m.

The best mode of a solid material for a magnet of the present invention is a solid material for a magnet wherein the $B_r$ is increased by enhancing the volume fraction of a magnetic material. Specifically, it is a solid material for a magnet wherein the density of the same is controlled to be preferably 7.45 g/cm$^3$ or more, and more preferably 7.50 g/cm$^3$ or more, and most preferably 7.60 g/cm$^3$ or more, and the maximum energy product (BH)$_{max}$ at normal room temperature is increased, by controlling the packing fraction of a R—Fe—N—H system magnetic material having a rhombohedral crystal including a Th$_2$Zn$_{17}$ type crystal-structure or a similar crystal structure thereto to 95% or more, and preferably 98% or more, and most preferably 99% or more, said solid material for a magnet having magnetic properties satisfying the expression (3) in the environment of an objective application.

On the other hand, even when a solid material for a magnet having the maximum energy product (BH)$_{max}$ at normal room temperature is formed by increasing the volume fraction of a magnetic material so as to enhance the B$_r$, if the T$_{max}$ is a high temperature such as 100° C. or more, and the expression (3) is not satisfied, the resultant solid material is remarkably demagnetized, and the performance of the same may come to be similar to that of a solid material for a magnet wherein the volume fraction of a magnetic material and the B$^r$ are small. That is, depending upon the combination of the P$_c$ and the T$_{max}$, and the H$_{cJ}$ of the solid material for a magnet, it makes no sense to increase the volume fraction of an R—Fe—N—H system magnetic material so as to enhance the B$_r$. In order to derive a solid material for a magnet which is light in weight and is high in cost/performance, it is preferred to decrease the volume fraction of a magnetic material.

The above will be explained by enumerating specific examples. When such R—Fe—N—H system magnetic powders as of H$_{cJ}$=0.62 MA/m are used as a raw material and a shock-wave compression process is employed, a solid material for a magnet having a volume fraction of approximately 100% by volume under a certain condition can be formed, wherein the B$_r$ is larger than 1.2 T.

However, in the case of an application wherein P$_c$=1, and T$_{max}$=100° C., judging from the formula (3), the B$_r$ is not necessary to be set to 0.99 T or more. That is, in this case, even when the resultant solid material for a magnet is the one having a B$_r$ larger than 0.99 T, the solid material is demagnetized through the operation or use of the resultant magnet, whereby the performance of the resultant magnet comes to be similar to that of a magnet having a B$_r$ of 0.99 T. Therefore, preferably, the volume fraction of the magnetic material is rather lowered to a value of about 83 to 85% by volume so as to form a magnet with approximately B$_r$=0.99 T, whereby a magnet which is light in weight and cheap in cost is derived.

The above is described about the thermal stability of a magnet, which depends upon the magnetic properties of a magnetic material, such as a minimum permeance-coefficient depending upon the shape of a magnet, the magnetic circuit and the operation of a magnet; B$_r$; H$_{cJ}$; α(B$_r$); and α(H$_{cJ}$) Thermal stability is also referred to as "temperature properties of a magnet".

In addition to the above, as the large cause of lowering thermal stability, the fact that magnetic powders are not sufficiently bonded to one another by metallic bonds for solidification can be enumerated. Since a permanent magnet forms a magnetostatic potential in an external field, it is essentially aligned a direction of easy-magnetization of the crystal. However, since the permanent magnet is magnetically in a non-equilibrium state, if it is in a state in which no magnetic powders are sufficiently bonded to one another and fixed, the direction of easy-magnetization is changed by the rotation of the individual magnetic powders in a matrix, whereby stocked magnetostatic energy is gradually decreased.

In a material having a magnetic powders packing fraction of less than 80%, such as a bonded magnet, when a resin therein is softened or deteriorated at a high temperature of 100° C. or more, relaxation is relatively easily caused, whereby the material will remarkably demagnetized. A bonded magnet is, as it's name suggests, a magnet bonded with a binder, and not a magnet fixed by metallic bonds. Poor thermal-stability can be said to be a problem caused thereby.

On the other hand, in a solid material for a magnet of the present invention, having the volume fraction of magnetic powders of 80% by volume or more, and preferably 83% by volume or more, and more preferably 90% by volume or more, and most preferably 95% by volume or more, since the magnetic powders are fixed to one another by metallic bonds, such relaxation as mentioned above is not caused. As described above, in order to achieve the thermal stability of the solid material which is satisfied at a temperature of 100° C. or more, according to the magnetic properties of the solid material and the application thereof, the lower limit and the upper limit of the volume fraction of the magnetic material should be defined within a specific range.

A solid material for magnet of the present invention can be also provided as a solid material for magnet which has a coercive force (H$_{cJ}$) of 0.76 MA/m or more and a rectangularity ratio (B$_r$/J$_s$) of 95% or more when it is formed into a magnet, without using a particular process, wherein J$_s$ is a saturation magnetization at normal room temperature, which is a magnetization value in the present invention when the external magnetic field is 1.2 MA/m.

For example, a Sm$_2$Fe$_{17}$N$_3$H$_{0.1}$ material has a relationship wherein the particle size is approximately in inverse proportion to the coercive force (H$_{cJ}$), because the material has a nucleation type magnetic-field inverting function. When the particle size is less than 2 μm, the coercive force comes to be larger than 0.76 MA/m. However, in this particle-size range, as the particle size of the magnetic powders is decreased, the powders come to be easily aggregated, whereby the degree of magnetic orientation of the magnetic powders is rapidly decreased at a magnetic field as commonly and industrially used, and the rectangularity ratio is decreased.

Figure 5:
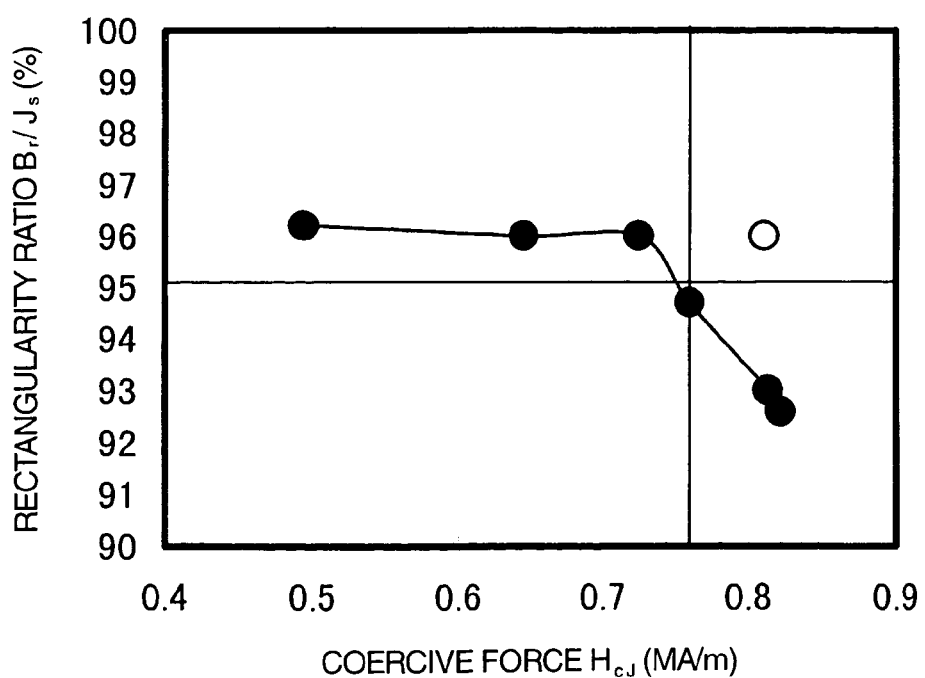
FIG. 5 is a graph illustrating the relationship between the coercive forces and the rectangularity ratios of solid materials (indicated by the mark ●) for magnets, which was produced by the steps of subjecting a $Sm_2Fe_{17}N_3H_{0.1}$ magnetic material to ball milling so as to derive magnetic powders having various particle-sizes, and subjecting the same to compression molding in a magnetic field; and the relationship between the coercive force and the rectangularity ratio of the solid material (indicated by the mark ○) for a magnet, produced in Working Example 6.

FIG. 5 illustrates the relationship (indicated by the mark ● in the figure) between the coercive forces (H$_{cJ}$) and the rectangularity ratios (B$_r$/J$_s$) of compression moldings, which was produced by subjecting magnetic powders having various particle sizes to compression molding under a condition of an external magnetic field of 1.2 MA/m and a molding pressure of 1.4 GPa, said magnetic powders being derived by pulverizing a Sm$_2$Fe$_{17}$N$_3$H$_{0.1}$ magnetic material by means of a ball mill. In FIG. 5, when the coercive force H$_{cJ}$ is larger than 0.73 MA/m, the rectangularity ratio is rapidly lowered to 95% or less at the H$_{cJ}$ of 0.76 MA/m or more.

When a solid material for a magnet of the present invention is subjected to shock-wave compression and solidification, the structure of the solid material can be made fine. Thus a solid material for a magnet having both a high rectangularity ratio and a high coercive force can be formed by preparing a powder compact having a high rectangularity ratio, with magnetic powders having a coercive force of less than 0.76 MA/m, and subjecting the same to shock-wave compression and solidification, and at the same time enhancing the coercive force. When the coercive force is in the range of 0.8 to 1.2 MA/m, the rectangularity ratio can be controlled within the range of 95% to approximately 100% by improving a method of magnetic orientation and components in the magnetic material.

Now, a method of producing a solid material for a magnet of the present invention, in particular, among others a shock-wave compression process by which a solid material for a magnet of the present invention can be realized, will be described. However, a producing method of the present invention does not limited thereto.

A shock-wave compression process by means of underwater shock-waves can be selected from the group consisting of: a process which comprises the steps of subjecting powders to powder compacting in the innermost of a double tube, adding water to the intermediate area, disposing a explosive on the periphery, and introducing shock-waves into water in said intermediate area by detonating the explosive, whereby said powders in the innermost are compressed; a process which comprises the steps of subjecting powders to powder compacting in a hermetically sealed container, throwing the same into water, detonating a explosive in water so as to compress said powders by shock-waves therefrom; and a process disclosed in Japanese Patent No. 2951349 or JP-A-6-198496. In any process, an advantage of shock compression from underwater shock-waves can be derived as described as follows:

In a compression and solidification step according to a shock-compression process with underwater shock-waves, of the present invention, very high pressure shearing-properties and an activating action which are carried by shock-waves induce a solidification action by metallic bonds in the powders, and an action of finely dividing the microstructure, whereby a bulk solidification and a high coercive force can be achieved.

Then, the duration of the shock-pressure itself is longer than the one in the case of using a conventional shock-waves, but the temperature-rise of the magnetic material as caused by the increase of entropy based upon bulk compression and the nonlinear phenomena of shock-waves is vanished at a very short time (at several µs or less), and decomposition or denitrification is scarcely caused.

A residual temperature exists also after compression with underwater shock-waves. When this residual temperature comes to be the decomposition temperature (about 600° C. at normal pressures) or more, an R—Fe—N—H system magnetic material and the like also start to be decomposed, whereby magnetic properties are deteriorated. Thus, it is not preferred.

However, when underwater shock-waves are used, a low residual temperature can be very easily maintained as compared with the one when conventional shock-waves are employed.

That is, underwater shock-waves have the following features.

(1) The pressure of underwater shock-waves depends upon a Hugoniot-relation between a explosive and water, and the pressure (P) can be approximately represented by the following formula:

$$P=288(\text{MPa})\{(\rho/\rho_o)^{7.25}-1\}.$$

According to the above formula, when underwater shock-waves are employed, the increment of the pressure (P) relevant to a variation to the standard value ($\rho_o$) of the density ($\rho$) of water is remarkably large. Therefore, a very high pressure can be easily derived by controlling the amount of the explosive, and the temperature of the magnetic material can be easier maintained at a low temperature as compared with the one in the case of using conventional shock-waves.

(2) The duration of the shock-pressure itself is long.

(3) The temperature-rise of the magnetic material as caused by the increase of entropy based upon bulk compression and the nonlinear phenomena of shock-waves is vanished at a very short time.

(4) Subsequently, a state wherein the temperature of the magnetic material is maintained at a high temperature for a long period of time is lessened.

(5) The shock-pressure is homogeneously applied to a compressed material.

Only by applying the above-mentioned features which underwater shock-waves have, an R—Fe—N—H system magnetic material can be easily compressed and solidified into a high density material without heat decomposition.

Furthermore, by subjecting the magnetic material to powder compacting in a magnetic field, the axis of easy magnetization of a magnetic material powders can be aligned to one direction, and even when the resultant powder compact is solidified by subjecting the same to shock compression and solidification, a solid material for a magnet having a magnetically uniaxial anisotropy can be derived without orientation deteriorated.

In the present invention, by subjecting a raw material magnetic powders to compression and solidification with underwater shock-waves having a shock-waves pressure of 3 to 40 GPa, a solid material for a magnet having a density of larger than 80% by volume in packing fraction to the true density (for example, 7.7 g/cm$^3$) of said raw material magnetic powders can be derived. When the shock-waves pressure is lower than 3 GPa, a solid material for a magnet having a packing fraction of 80% by volume can not always derived. Besides, when the shock-waves pressure is higher than 40 GPa, a decomposition matter such as an α-Fe decomposed phase is easily formed. Thus such pressure is not preferred. When compression and solidification with underwater shock-waves having a shock-waves pressure of 3 to 40 GPa are carried out, a solid material for a magnet having a density of larger than 80% by volume in packing fraction to the true density of said raw material magnetic powders can be derived with good reproducibility. On the other hand, when underwater shock-waves having a shock-waves pressure of 6 to 40 GPa are used, a solid material for a magnet having a high density of larger than 90% by volume in packing fraction can be derived. However, when a solid component in addition to an R—Fe—N—H system magnetic material, for example, a soft magnetic material, a hard magnetic material such as a rare-earth/iron/boron system magnetic material, and/or a non-magnetic phase, is included, the above conditions are not determined by only the volume fraction of an R—Fe—N—H system raw material magnetic powders. However, in order to derive a solid material for a magnet having the volume fraction of the R—Fe—N—H system magnetic material of 50% by volume or more without decomposition, underwater shock-waves have to be controlled to a shock-waves pressure within 3 to 40 GPa in a similar manner to the above.

Next, in order to produce a high-density solid material for a magnet, which is a first mode of a solid material for a magnet of the present invention, underwater shock-waves having a shock-waves pressure of 8 to 40 GPa should be used. When the shock-waves pressure is lower than 8 GPa, a bulk magnet having a density of 7.45 g/cm$^3$ or more can not be always derived. When the shock-waves pressure is higher than 40 GPa, a decomposed matter such as an α-Fe decomposed phase may be formed. Thus such a pressure is not preferred.

Furthermore, in order to produce a solid material for a magnet which is light in weight and excellent in high temperature properties, which is a second mode of a solid material for a magnet of the present invention, underwater shock-waves having a shock-waves pressure of 3 to 22 GPa should be used for shock compression so as to control the temperature rise of a powder compact on shock compression. When the shock-waves pressure is lower than 3 GPa, a solid material for a magnet having a density of 6.15 g/cm$^3$ or more can not be always derived. When the shock-waves pressure is higher than 22 GPa, a solid material for a magnet having a density of 7.45 g/cm$^3$ or more is frequently formed. Besides, when the shock-waves pressure is higher than 40 GPa, a decomposed matter such as an α-Fe decomposed phase may be formed. Thus such a pressure is not preferred. Additionally, in order to derive a solid material for a magnet having a density in the range of 6.35 to 7.45 g/cm$^3$, and furthermore in the range of 6.50 to 7.40 g/cm$^3$ with good reproducibility, the shock-waves pressure should be controlled to a value of 3 to 20 GPa, and furthermore to a value of 4 to 15 GPa. However, in the case of a magnetic material/gas composite solid material for a magnet, an excessive shock-wave pressure easily forms a solid material for a magnet having a density of larger than 7.45 g/cm$^3$. Thus it is rather preferred to use underwater shock-wave having a shock-waves pressure of 3 to 15 GPa.

As mentioned above, only by selecting an R—Fe—N—H system magnetic material which is thermally stable as magnetic powders, and is difficult to precipitate an α-Fe decomposed phase and the like, and subjecting the same to solidification according to the underwater shock-waves compression and solidification process mentioned above, a solid material for a magnet of the present invention can be produced. A magnet as produced with this solid material for a magnet is high in magnetic properties, and excellent in oxidation resistance, and excellent in thermal stability because the solid material includes no resin component as a binder for magnetic powders, differently from a bonded magnet.

Next, a part or a device including an R—Fe—N—H system solid material for a magnet, which is a third mode of the present invention will be described as follows.

In the application wherein the maximum working temperature ($T_{max}$) is 100° C. or more, since a conventional R—Fe—N—H system bonded magnet includes a resin component and no magnetic powders are bonded to one another by metallic bonds and solidified, the magnet was poor in thermal stability, and difficult to be used. A solid material for a magnet of the present invention is excellent in thermal stability, because R—Fe—N—H system magnetic powders are bonded to one another by metallic bonds and solidified even if a resin component is included. Furthermore, when the $B_r$ and the $H_{cJ}$ of a solid material for a magnet are in the range as defined by the $P_c$ and $T_{max}$ of a magnet produced therefrom, and the formula (3), a magnet which is not remarkably demagnetized, light in weight, high in cost/performance, and further excellent in thermal stability can be formed.

The upper limit of $T_{max}$ is near the Curie point of the R—Fe—N—H system magnetic material, and larger than 400° C., and depending upon the composition or components of a solid material for a magnet, and a use as a magnet, the upper limit of $T_{max}$ may be various values of 400° C. or less. For example, even when an R—Fe—N—H system material as covered with Zn, having $H_{cJ}$=1.6 MA/m, is used, if Tmax is 220° C. or more, a solid material for a magnet of the present invention can not be used as a magnet.

The $P_{cO}$ of a magnet derived from a solid material for a magnet of the present invention is in the range of 0.01 to 100, and more preferably in the range of 0.1 to 10, when the combination of the values of $P_{cO}$, $B_r$ and $H_{cJ}$ is deviated from the range of the formula (1), it is preferred that a yoke or the like are provided, and thereafter the $P_{cO}$ is increased, and magnetization is provided.

A device and a part in which a magnetostatic field generated from a magnet derived from a solid material for a magnet of the present invention, among others, a solid material for a magnet of the second mode, or a solid material for a magnet defined in claim 11 or said mode (S) of the present invention, for example, various actuators, a voice coil motor, a linear motor, a rotary machine motor as a rotor or a stator, among others in particular, a motor for an industrial machine or an automobile, a magnetic-field generating source for a medical treatment device or a metal classifier, as well as a magnetic-field generating source for a analysis machine such as a VSM system, an ESR system or an accelerator, a magnetron travelling-wave tube, OA-equipment such as a printer head or an optical pickup, an undulator, a wiggler, a retarder, a magnet roller, a magnet chuck, various magnet sheets, can be stably used without generating remarkable demagnetization even in an environment of 100° C. or more, except for a particular application such as a stepping motor having a very small $P_c$.

For some applications, the magnet can be used even at a temperature of 125° C. or more. For example, a case in which $H_{cJ}$>0.7 (MA/m) and $P_c$>1 can be enumerated. Furthermore, the magnet can be used even at a temperature of 150° C. or more, for example, in a case in which $H_{cJ}$>0.8 (MA/m) and $P_c$>2.

Additionally, when the magnet is used in a device or a part mentioned above, solid materials for a magnet of the present invention may be used by subjecting the same to various processes, and thereafter subjecting the same to bonding, adhesion and conjugation together with variously-shaped yokes, hole pieces, or various magnetic shunt materials, and combining the same with one another.

Besides, when a solid material for a magnet is used as a rotor for a permanent-magnet synchronous motor, or as a hard magnetic material of the constituent materials, the solid material is used in a rotor having a surface magnet structure, which may have a section structure of a rotation axis as shown FIG. 6 or 7, or a section structure of a rotation axis as shown in any one of FIGS. 8 to 13.

Hereinafter, the present invention will be exemplified according to the Examples. Incidentally, on the basis of an X-ray diffraction pattern (using Cu—Kα radiation), the degree of the decomposition of an R—Fe—N—H system magnetic material was evaluated by a ratio (b/a) of the height (b) of a diffraction line from an α-Fe decomposed phase near 2θ=44° to the height (a) of the most intense line in diffraction lines from a rhombohedral or hexagonal crystal structure, in particular such as a $Th_2Zn_{17}$-type crystal structure. When this ratio value is 0.2 or less, it can be said that the degree of the decomposition is small. This ratio value is preferably 0.1 or less. It is more preferably 0.05 or less, when it can be said that the decomposition scarcely exists.

However, when an R—Fe—N—H system magnetic material used as a raw material for a solid material for a magnet originally includes such a material as has a peak near 44°, such as a Fe-soft magnetic material, the criterion mentioned above can not be applied thereto. In this case, comparison ratio between the ratio "b/a" from a raw material including such an R—Fe—N—H system magnetic material and the ratio "b/a" from a solid material for a magnet produced therefrom can be used as a guide to whether the magnetic material was decomposed or not.

EXAMPLE 1

A mother alloy of $Sm_2Fe_{17}$ having an average particle size of 60 μm was subjected to nitrogenation and hydrogenation at a temperature of 465° C. in an ammonia-hydrogen mixed gas flow-current having an $NH_3$-partial pressure of 0.35 atm and a $H_2$-partial pressure of 0.65 atm for a period of 7.2 ks, and then it was annealed in an argon flow-current for a period of 1.8 ks, and thereafter it was pulverized by a ball mill into an average particle size of about 2 μm. The powders were subjected to powder compacting while subjected to a magnetic alignment in a magnetic field of 1.2 MA/m, whereby a compact was derived. FIG. 14 is a schematic diagram illustrating one embodiment of a device for carrying out a shock-compression process with underwater shock-waves. As shown in FIG. 14, the derived compact was set in a copper pipe (1) and was fixed to a copper plug (2). Furthermore, a copper pipe (3) was fixed to the copper plug (2), and the gap therebetween was filled with water, and a cardboard tube (4) was disposed on the periphery of the copper pipe (3) with a homogeneous space between the cardboard tube (4) and the copper pipe (3), and the space therebetween was filled with 280 g of an ammonium-nitrate system explosive (5), and then the high-explosive (5) was initiated through an initiation portion (6), and thus the high-explosive (5) was detonated. Then, the pressure of shock-wave was 16 GPa.

After the shock-compression process, a solidified solid material for a magnet having a composition of $Sm_{8.8}Fe_{75.1}N_{13.2}H_{2.9}$ was removed from the pipe (1), and was magnetized in a pulsed magnetic field of 4.0 MA/m, and the magnetic properties were determined. Resultantly, a residual magnetic flux density $(B_r)$=1.22T, a coercive force $(H_{cJ})$=0.75 MA/m, a maximum energy product $(BH)_{max}$=260 kJ/m$^3$ were derived. Additionally, a density thereof was determined according to Archimedean method. Resultantly, a density of 7.61 g/cm$^3$ and a packing fraction of 99% were derived.

Furthermore, as a result of an X-ray diffraction method analysis, it was confirmed that an α-Fe decomposed phase was scarcely precipitated in the solidified solid material for a magnet, and the solid material included a crystal structure of $Th_2Zn_{17}$-type rhombohedral.

The amount of the explosive was adjusted so as to repeat similar experiments many times.

It was confirmed that when the shock-wave pressure was less than 4 GPa, the packing fraction of the resultant solid material for a magnet was not necessarily larger than 80%, and when the shock-wave pressure was larger than 40 GPa, decomposed matters such as an α-Fe decomposed phase were formed. Furthermore, it was also found that in order to derive a solid material for a magnet having a packing fraction larger than 80% with reproducibility improved, the pressure of shock-waves should be preferably set in the range of 3 to 40 GPa. Besides, it was also found that when the shock-wave pressure was set in the range of 6 to 40 GPa, a solid material for a magnet having a packing fraction larger than 90% was derivable with reproducibility improved.

Furthermore, it was also found that in order to derive a solid material for a magnet having a density of 6.15 to 7.45 g/cm$^3$ with reproducibility improved, it was preferred to set the pressure of shock-waves to the range of 3 to 15 GPa.

Besides, it was also found that in order to derive a solid material for a magnet having a density of larger than 7.45 g/cm$^3$ with reproducibility improved, it was preferred to set the pressure of shock-waves to the range of 10 to 40 GPa. Furthermore, it was also confirmed that when the pressure of shock-waves was set in the range of 12 to 40 GPa, a bulk magnet having a density larger than 7.55 g/cm$^3$ with reproducibility improved.

COMPARATIVE EXAMPLE 1

A solid material for a magnet having a composition of $Sm_{9.1}Fe_{77.7}N_{13.2}$ was produced in a similar manner to the one in Example 1, except that a mother alloy of $Sm_2Fe_{17}$ having an average particle size of 20 μm was subjected to nitrogenation at a temperature of 495° C. in a $N_2$ gas flow-current for a period of 72 ks, and the shock-wave pressure was set to 18 GPa. This solid material for a magnet was magnetized in a pulsed magnetic field of 4.0 MA/m, and the magnetic properties were determined. Resultantly, a residual magnetic flux density $(B_r)$=0.96T, a coercive force $(H_{cJ})$=0.36 MA/m, $(BH)_{max}$=120 kJ/m$^3$ were derived. Additionally, a density thereof was determined according to Archimedean method. Resultantly, a density of 7.50 g/cm$^3$ was derived.

In an X-ray diffraction pattern of this material, diffraction lines from an α-Fe decomposed phase as well as the ones from a crystal structure of $Th_2Zn_{17}$-type rhombohedral were observed. The ratio (b/a) of the intensity of a diffraction line near 44° from the α-Fe decomposed phase and the intensity of the most intense line (303) indicating the crystal structure of $Th_2Zn_{17}$-type rhombohedral was 0.21.

COMPARATIVE EXAMPLE 2

FIG. 15 is a schematic diagram illustrating one embodiment of a device for carrying out a shock-compression by directly using detonation waves from a explosive. Using this device, the R—Fe—N—H system magnetic powders having an average particle size of 2 μm which had been derived in Example 1 were set in a copper pipe (1), and were fixed to a copper plug (2), and a cardboard tube (4) was disposed on the periphery of the copper pipe (1) with a homogeneous space between the cardboard tube (4) and the copper pipe (1), and the space there between was filled with an ammonium-nitrate system explosive (5) in the same amount as in Example 1, and then the explosive was initiated through an initiation portion (6), and thus the explosive was detonated. After the shock compression, the solidified sample was removed from the pipe (1), and was analyzed according to an X-ray diffraction method. Resultantly, it was confirmed that after the shock compression, SmN and a plenty of an α-Fe decomposed phase were produced, whereby it was found that the R—Fe—N—H system compound of the starting material was decomposed. Then, the intensity ratio (b/a) of the diffraction lines was about 3.

EXAMPLE 2

Powders of Sm and Fe metals in a predetermined amount (at a weight ratio of 16.85:83.15) were subjected to a mechanically-alloying treatment by means of a vibration ball-mill for a period of 180 ks, and thereafter heat-treated at a temperature of 600° C. in vacuum for a period of 7.2 ks. These powders included about 30% by volume of a Fe soft-magnetic material. The powders were subjected to nitrogenation and hydrogenation at a temperature of 380° C. in an ammonia-hydrogen mixed gas flow-current having an $NH_3$-partial pressure of 0.35 atm and a $H_2$-partial pressure of 0.65 atm for a period of 1.2 ks, and subsequently heat-treated at the same temperature in hydrogen for a period of 300 seconds. Using these powders, a solid material for a magnet having a composition of $Sm_{6.1}Fe_{81.6}N_{9.2}H_{3.1}$ was produced in a similar manner to the one in Example 1, except that the pressure of shock-waves was set to 18 GPa.

This solid material for a magnet was magnetized in a pulsed magnetic field of 4.0 MA/m, and the magnetic properties were determined. As a result, a residual magnetic flux density $(B_r)$=1.25 T, a coercive force $(H_{cJ})$=0.40 MA/m, a maximum energy product $(BH)_{max}$=209 kJ/m$^3$ were derived. Additionally, a density thereof was determined according to Archimedean method. As a result, a density of 7.74 g/cm$^3$ was derived.

In an X-ray diffraction pattern of this material, diffraction lines from an α-Fe decomposed phase as well as the ones from a crystal structure of $Th_2Zn_{17}$-type rhombohedral were observed. However, since this material is intrinsically the one including a Fe magnetically-soft material which is not an α-Fe decomposed phase, it could not be rigorously determined by means of X-ray diffraction method whether the α-Fe decomposed phase was formed or not through solidification. Incidentally, as a result of observations through a transmission electron microscope, the volume percentage of the Fe soft magnetic phase was about 30%, and the crystal grain size was approximately 10 to 50 nm.

EXAMPLE 3

R—Fe—N—H system powders having an average particle size of 2 μm which had been derived in Example 1, and Sm—Co system powders having an average particle size of 25 μm and a composition of $Sm_{11.5}Co_{57.6}Fe_{24.8}Cu_{4.4}Zr_{1.7}$ were charged into an agate mortar so that a volume ratio of 50:50 could be derived, and were wet-blended in cyclohexane.

Using these blended powders, an R—Fe—N—H system solid material for a magnet was prepared in a similar manner to the one in Example 1, except that the pressure of shock waves was set to 14 GPa. This solid material for a magnet was magnetized in a pulsed magnetic field of 4.0 MA/m, and the magnetic properties were determined. Resultantly, a residual magnetic flux density $(B_r)$=1.10 T, a coercive force $(H_{cJ})$=0.83 MA/m, $(BH)_{max}$=209 kJ/m$^3$ were derived.

EXAMPLE 4

According to a photolysis method using publicly known diethyl zinc, Sm—Fe—Co—N—H magnetic powders having an average particle size of about 1 μm, the surfaces of which were coated with a Zn-metal were prepared. Using these powders, a solid material for a magnet having a composition of $Sm_{8.4}Fe_{64.3}Co_{7.1}N_{12.6}H_{3.4}Zn_{4.2}$ was produced in a similar manner to the one in Example 1, except that the pressure of shock waves was set to 16 GPa.

This solid material for a magnet was magnetized in a pulsed magnetic field of 4.0 MA/m, and the magnetic properties were determined. Resultantly, a residual magnetic flux density $(B_r)$=1.27 T, a coercive force $(H_{cJ})$=0.76 MA/m, $(BH)_{max}$=257 kJ/m$^3$, and a density of 7.71 g/cm$^3$ were derived. Furthermore, it was analyzed according to an X-ray diffraction method. Resultantly, it was confirmed that the solidified solid material for a magnet has a crystal structure of $Th_2Zn_{17}$-type rhombohedral. The ratio (b/a) of the intensity of a diffraction line near 44° from the α-Fe decomposed phase and the intensity of the most intense line (303) indicating the crystal structure of $Th_2Zn_{17}$-type rhombohedral was 0.08.

EXAMPLE 5

According to a publicly known method JP-A-8-55712, Sm—Fe—Co—Mn—N—H magnetic powders having an average particle size of 30 μm were derived wherein magnetic reversal mechanism is of a pinning type. Using the powders, a solid material for a magnet having a composition of $Sm_{8.5}(Fe_{0.89}Co_{0.11})_{66.8}Mn_{3.6}N_{18.5}H_{2.6}$ was produced in a similar manner to the one in Example 1, except that the pressure of shock waves was set to 14 GPa. This solid material for a magnet was magnetized in a pulsed magnetic field of 4.0 MA/m, and the magnetic properties were determined. Resultantly, a residual magnetic flux density $(B_r)$= 1.12 T, a coercive force $(H_{cJ})$=0.37 MA/m, $(BH)_{max}$=125 kJ/m$^3$. The density determined according to a volume method was 7.70 g/cm$^3$.

Furthermore, in an X-ray diffraction pattern of this material, diffraction lines from an α-Fe decomposed phase as well as the ones from a crystal structure of $Th_2Zn_{17}$-type rhombohedral were observed. The ratio (b/a) of the intensity of a diffraction line near 44° from the α-Fe decomposed phase and the intensity of the most intense line (303) indicating the crystal structure of $Th_2Zn_{17}$-type rhombohedral was 0.06.

EXAMPLE 6

A solid material for a magnet was produced in a similar manner to the one in Example 1, except that a component in addition to an R—Fe—N—H system magnetic material, and the pressure of shock waves as shown in Table 1 were used. This solid material for a magnet was magnetized in a pulsed magnetic field of 4.0 MA/m, and a residual magnetic flux density $(B_r)$, a coercive force $(H_{cJ})$, a rectangularity ratio $(B_r/J_s)$, and $(BH)_{max}$ were determined.

The results are shown in Table 1. In spite of a large value 0.81 MA/m of $H_{cJ}$ the rectangularity ratio was 96%. The result is shown by the mark "○" in FIG. 5, which is compared with the ones of ordinary compression moldings.

EXAMPLES 7 TO 9

In each of these Examples, a solid material for a magnet was produced in a similar manner to the one in Example 1, except that a component in addition to an R—Fe—N—H system magnetic material, and the pressure of shock waves as shown in Table 1 were used. In the same manner as the one in Example 6, various magnetic properties for each of the solid materials were determined. The results are shown in Table 1.

EXAMPLES 10 AND 11 AND COMPARATIVE EXAMPLE 3

In each of these Examples, a solid material for a magnet was produced in a similar manner to the one in Example 1, except that magnetic powders having a composition of $Sm_{9.0}Fe_{76.4}N_{13.5}H_{1.1}$ and an average particle size of 2.5 μm were used, and except that the pressures of shock waves of 3 GPa and 23 GPa were applied in Examples 10 and 11, respectively. Various magnetic properties for each of the solid materials for a magnet were determined in the same manner as the one in Example 1. The results are shown in Table 2.

Furthermore, each of these solid materials for a magnet was accurately worked in a disc of uniform shape, and was magnetized in a pulsed magnetic field of 4.8 MA/m, whereby a magnet having a $P_{cO}$ of 2. These magnets were left in a thermostatic bath of 125° C. for a period of 3.6 Ms with care not to apply an opposing magnetic field to the utmost. Using a samples-pulling type fluxmeter, the values of a magnetic flux before and after leaving in the thermostatic bath were determined so as to calculate a rate of change in magnetic flux, that is, an irreversible demagnetization factor (%). The results are shown in Table 2, wherein it can be estimated that the smaller the absolute value of an irreversible demagnetization factor is, the better the thermal-stability is. Furthermore, according to a publicly known method, an injection molded bonded magnet having a magnetic powders volume-ratio of 60% and a $P_{cO}$ of 2 and using 12-nylon as a binder, which is not a solid material for a magnet, was produced (Comparative Example 3). In the same manner as the one mentioned above, an irreversible demagnetization factor thereof was determined. The result is shown in Table 2.

The results derived with the estimation mentioned above are relevant to check out the degree of demagnetization before and after operation or use, when an application wherein $P_c$ is equal to $P_{cO}$ and $T_{max}$=125° C. is taken into account.

As shown in Table 2, when the volume fraction of an R—Fe—N—H system magnetic material is less than 80% without including other inorganic or metallic components, for example, in Comparative Example 3, since the magnetic powders are not bonded to one another by metallic bonds and are not solidified, the magnetic material had a very low thermal-stability. Furthermore, in Examples 10 and 11 wherein the magnetic powders are bonded to one another by metallic bonds and are solidified, it was found that the thermal-stability of the lightweight solid material for a magnet in Example 10 wherein the formula (3) is satisfied by the $P_c$, $T_{max}$, $B_r$ and $H_{cJ}$ is better than the one in Example 11 wherein the formula (3) is not satisfied thereby.

EXAMPLES 12 AND 13

A DC-motor having a brush as a stator, wherein two magnets produced in Example 10 were fixed with no yoke was assembled, and then operated for a period of 36 ks in a temperature environment of 100° C. while a predetermined magnitude of electric power was applied to a coil (as Example 12). Furthermore, a motor with magnets produced in Working Example 11 was assembled and operated in the same manner as mentioned above (as Example 13). The revolution speeds after 36 ks of the motors in Examples 12 and 13 were changed by about 2% and about 10%, respectively, as compared with the ones immediately after the initial revolution speeds had been stabilized. The revolution speed after 36 ks was approximately 510 rpm in each case. The density of the magnets produced in Example 10 which were used in the motor in Example 12 was lower by no less than 17% as compared with the one of the magnets produced in Example 11 which were used in the motor in Example 13. Thus the volume fraction of the R—Fe—N—H system magnetic material produced in Example 10 was lower than the one in Example 11. However, when the magnetic materials were used in the above-mentioned motors, the performance of the former magnetic material was the same as the one of the latter.

EXAMPLE 14

A magnet having a density of 7.38 g/cm³ was produced in a similar manner to the one in Example 10, except that $ZrO_2$ was used as a component in addition to an R—Fe—N—H system magnetic material, and the pressure of shock-waves was set to 14 GPa. Thereafter a motor was assembled in a similar manner to the one in Example 12, and operated in a temperature environment of 100° C. As a result, equivalent performance to the one in Example 12 was derived.

TABLE 1

| Example | Components except R—Fe—N—H System Magnetic Material | Volume Fraction of R—Fe—N—H System Magnetic Material (%) | Pressure of Shock-Waves (Gpa) | Density (g/cm³) | $B_r$ (T) | $H_{cJ}$ (MA/m) | $B_r/J_s$ (%) | $(BH)_{max}$ (kJ/m³) |
|---|---|---|---|---|---|---|---|---|
| 6 | $Al_2O_3$ | 96 | 15 | 7.45 | 1.18 | 0.81 | 96 | 243 |
| 7 | TiC | 90 | 15 | 7.41 | 1.11 | 0.78 | 96 | 213 |
| 8 | $Si_3N_4$ | 85 | 15 | 7.18 | 1.04 | 0.75 | 97 | 194 |
| 9 | Epoxy Resin | 83 | 15 | 6.55 | 1.01 | 0.73 | 97 | 177 |

TABLE 2

| Example or Comparative Example | Volume Fraction of R—Fe—N—H System Magnetic Material (%) | Pressure of Shock-Waves (Gpa) | Density (g/cm³) | $B_r$ (T) | $J_s$ (T) | $H_{cJ}$ (MA/m) | $(BH)_{max}$ (kJ/m³) | Irreversible Demagnetization Factor (%) |
|---|---|---|---|---|---|---|---|---|
| Ex. 10 | 85 | 3 | 6.54 | 1.06 | 1.08 | 0.63 | 187 | −10 |
| Ex. 11 | 100 | 23 | 7.68 | 1.25 | 1.30 | 0.63 | 260 | −25 |
| Comparative Ex. 3 | 60 | — | 5.00 | 0.78 | 0.81 | 0.60 | 105 | −25 |

INDUSTRIAL APPLICABILITY

According to the present invention, a rare-earth/iron/nitrogen/hydrogen system magnetic powders or the like, having a rhombohedral or hexagonal crystal structure is subjected to powder compacting and to shock-compression with underwater shock-waves, whereby a high-performance solid material for a magnet having a high density can be derived with requiring no binder, by means of no self-sintering, while decomposition and denitrification are prevented, and furthermore, a high-performance solid material for a magnet which in spite of lightness in weight, has in particular high stability in magnetic properties can be derived.

The invention claimed is:

1. A method of producing a solid material for a magnet comprising a rare-earth/iron/nitrogen/hydrogen system magnetic material, said method comprising subjecting said solid material to shock-compaction via underwater shock-waves.

2. A method as claimed in claim 1, wherein the pressure of shock-waves is in a range of 3 to 40 GPa.

3. A method as claimed in claim 1, wherein raw-material powders are subjected to powder compacting in a magnetic field.

4. A method as claimed in claim 1, comprising the step of heat-treating said material at least once at a temperature of 100° C. or more but less than a decomposition temperature.

* * * * *